United States Patent
Tan et al.

(10) Patent No.: US 11,366,291 B2
(45) Date of Patent: Jun. 21, 2022

(54) CAMERA OPTICAL LENS

(71) Applicant: AAC Optics (Changzhou) Co., Ltd., Changzhou (CN)

(72) Inventors: Mengke Tan, Shenzhen (CN); Xuqi Bian, Shenzhen (CN)

(73) Assignee: AAC Optics (Changzhou) Co., Ltd., Changzhou (CN)

(*) Notice: Subject to any disclaimer, the term of this patent is extended or adjusted under 35 U.S.C. 154(b) by 42 days.

(21) Appl. No.: 17/134,183

(22) Filed: Dec. 25, 2020

(65) Prior Publication Data
US 2022/0035129 A1    Feb. 3, 2022

(30) Foreign Application Priority Data

Jul. 28, 2020 (CN) .......................... 202010733567.5

(51) Int. Cl.
*G02B 9/16* (2006.01)
*G02B 13/00* (2006.01)
*G02B 9/14* (2006.01)
*G02B 13/06* (2006.01)

(52) U.S. Cl.
CPC .......... *G02B 13/0035* (2013.01); *G02B 9/14* (2013.01); *G02B 13/06* (2013.01)

(58) Field of Classification Search
CPC ... G02B 9/12; G02B 9/14; G02B 9/16; G02B 13/0035
See application file for complete search history.

(56) References Cited

U.S. PATENT DOCUMENTS

2018/0017763 A1* 1/2018 Shi .......................... G02B 9/14

* cited by examiner

*Primary Examiner* — Jack Dinh
(74) *Attorney, Agent, or Firm* — W&G Law Group

(57) ABSTRACT

A camera optical lens includes, from an object side to an image side, a first lens having a positive refractive power; a second lens having a negative refractive power; and a third lens having a positive refractive power, and satisfies: $0.65 \leq f1/f \leq 0.85$; $-0.90 \leq f2/f \leq -0.60$; $1.00 \leq f3/f \leq 1.20$; $-8.00 \leq (R5+R6)/(R5-R6) \leq -2.50$; $2.50 \leq d5/d4 \leq 4.50$; and $1.55 \leq n2 \leq 1.70$, where f, f1, f2, and f3 respectively denote focal lengths of the camera optical lens, the first lens, the second lens, and the third lens; R5 and R6 respectively denote central curvature radii of object side and image side surfaces of the third lens; d4 denotes an on-axis distance from an image side surface of the second lens to an object side surface of the third lens; d5 denotes an on-axis thickness of the third lens; and n2 denotes a refractive index of the second lens, thereby achieving good optical performance while meeting requirements of ultra-thinness and a wide angle.

10 Claims, 19 Drawing Sheets

CAMERA OPTICAL LENS

TECHNICAL FIELD

The present invention relates to the field of optical lens, and more particularly, to a camera optical lens suitable for portable terminal devices such as smart phones and digital cameras and camera devices such as monitors or PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain better imaging quality, and with the development of technology and the increase of the diverse demands of users, and as the pixel area of photosensitive devices is becoming smaller and smaller and the requirement of the system on the imaging quality is improving constantly, a three-lens structure gradually appears in lens designs. Although the common three-lens structure already has good optical performance, its settings on refractive power, lens spacing and lens shape still have some irrationality, which results in that the lens structure cannot achieve a high optical performance while satisfying design requirements for ultra-thinness and a wide angle.

SUMMARY

In view of the problems, the present invention aims to provide a camera lens, which can achieve a high optical performance while satisfying design requirements for ultra-thinness and a wide angle.

In an embodiment, the present invention provides a camera optical lens. The camera optical lens includes a total of three lenses, and the three lenses are sequentially, from an object side to an image side: a first lens having a positive refractive power; a second lens having a negative refractive power; and a third lens having a positive refractive power, wherein the camera optical lens satisfies following conditions: $0.65 \leq f1/f \leq 0.85$; $-0.90 \leq f2/f \leq -0.60$; $1.00 \leq f3/f \leq 1.20$; $-8.00 \leq (R5+R6)/(R5-R6) \leq -2.50$; $2.50 \leq d5/d4 \leq 4.50$; and $1.55 \leq n2 \leq 1.70$, where f denotes a focal length of the camera optical lens; f1 denotes a focal length of the first lens; f2 denotes a focal length of the second lens; f3 denotes a focal length of the third lens; R5 denotes a central curvature radius of an object side surface of the third lens; R6 denotes a central curvature radius of an image side surface of the third lens; d4 denotes an on-axis distance from an image side surface of the second lens to the object side surface of the third lens; d5 denotes an on-axis thickness of the third lens; and n2 denotes a refractive index of the second lens.

In an improved embodiment, the camera optical lens further satisfies a following condition: $1.50 \leq d1/d2 \leq 3.50$, where d1 denotes an on-axis thickness of the first lens, and d2 denotes an on-axis distance from an image side surface of the first lens to an object side surface of the second lens.

In an improved embodiment, the camera optical lens further satisfies a following condition: $-3.00 \leq (R3+R4)/(R3-R4) \leq -1.50$, where R3 denotes a central curvature radius of an object side surface of the second lens, and R4 denotes a central curvature radius of the image side surface of the second lens.

In an improved embodiment, the camera optical lens further satisfies following conditions: $-1.72 \leq (R1+R2)/(R1-R2) \leq -0.21$; and $0.08 \leq d1/TTL \leq 0.44$, where R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

In an improved embodiment, the camera optical lens further satisfies a following condition: $0.03 \leq d3/TTL \leq 0.19$, where d3 denotes an on-axis thickness of the second lens; and TTL denotes a total optical length from an object side surface of the first lens to an image plane of the camera optical lens along an optic axis.

In an improved embodiment, the camera optical lens further satisfies a following condition: $0.07 \leq d5/TTL \leq 0.46$, where TTL denotes a total optical length from an object side surface of the first lens to an image plane of the camera optical lens along an optic axis.

In an improved embodiment, the camera optical lens further satisfies a following condition: $TTL/IH \leq 1.65$, IH denotes an image height of the camera optical lens, and TTL denotes a total optical length from an object side surface of the first lens to an image plane of the camera optical lens along an optic axis.

In an improved embodiment, a field of view of the camera optical lens is greater than or equal to 70°.

In an improved embodiment, an F number of the camera optical lens is smaller than or equal to 2.51.

In an improved embodiment, the camera optical lens further satisfies a following condition: $1.10 \leq f12/f \leq 4.37$, where f12 denotes a combined focal length of the first lens and the second lens.

The present invention has at least the following beneficial effects. The cameral optical lens of the present invention has excellent optical performance while having the characteristics of ultra-thinness and a wide angle, and is especially suitable for camera lens assembly of mobile phones and WEB camera lenses formed by imaging elements such as CCD and CMOS for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
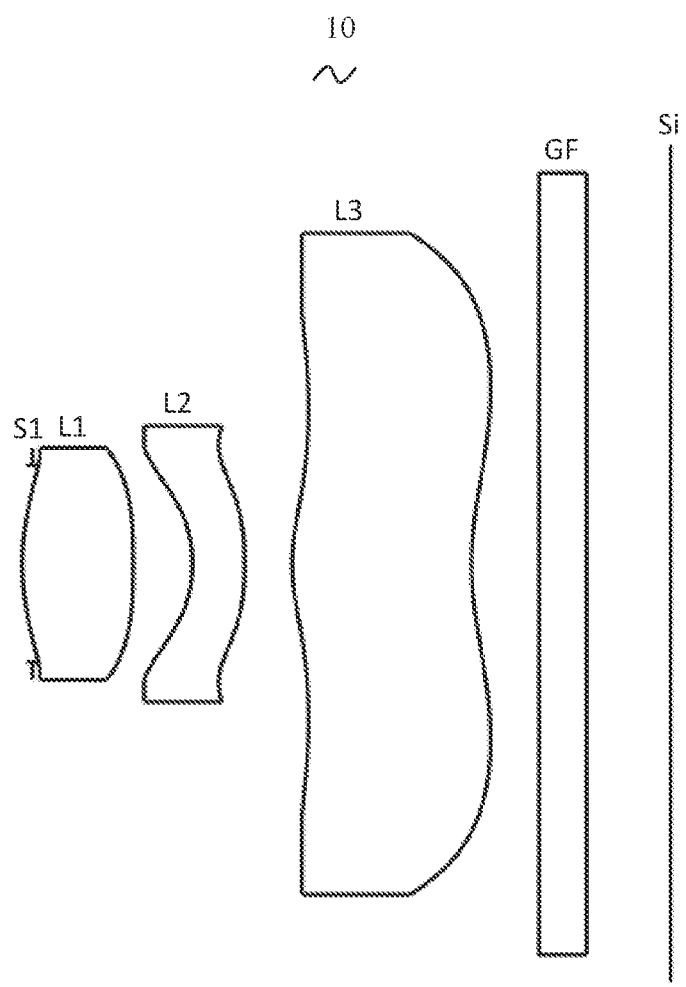
FIG. 1 is a schematic structural diagram of a camera optical lens according to Embodiment 1 of the present invention.

Referring to FIG. 1, the present invention provides a camera optical lens 10. FIG. 1 shows the camera optical lens 10 according to Embodiment 1 of the present invention. The camera optical lens 10 includes three lenses. Specifically, the camera optical lens 10 includes, from an object side to an image side, an aperture S1, a first lens L1, a second lens L2, and a third lens L3. An optical element such as an optical filter (GF) can be arranged between the third lens L3 and an image plane Si.

In this embodiment, the first lens L1 has a positive refractive power, the second lens L2 has a negative refractive power, and the third lens L3 has a positive refractive power.

In this embodiment, the first lens L1 is made of a plastic material, the second lens L2 is made of a plastic material, and the third lens L3 is made of a plastic material. In other embodiments, the lenses can also be made of other materials.

In this embodiment, a focal length of the camera optical lens 10 is defined as f, and a focal length of the first lens L1 is defined as f1. The camera optical lens 10 satisfies a condition of $0.65 \leq f1/f \leq 0.85$, which specifies a ratio between the focal length of the first lens and the focal length of the camera optical lens. When the condition is satisfied, a spherical aberration and the field curvature of the system can be effectively balanced.

The focal length of the camera optical lens 10 is defined as f, and a focal length of the second lens L2 is defined as f2. The camera optical lens 10 further satisfies a condition: $-0.90 \leq f2/f \leq -0.60$, which satisfies a ratio of the focal length of the second lens L2 to the focal length of the system. This leads to the more appropriate allocation of the focal length, thereby achieving a better imaging quality and a lower sensitivity of the system.

The focal length of the camera optical lens 10 is defined as f, and a focal length of the third lens L3 is defined as f3. The camera optical lens 10 further satisfies a condition: $1.00 \leq f3/f \leq 1.20$, which satisfies a ratio of the focal length f3 of the third lens L3 to the focal length f of the system. The appropriate allocation of the refractive power leads to better imaging quality and a lower sensitivity of the system.

A central curvature radius of an object side surface of the third lens L3 is defined as R5, and a central curvature radius of an image side surface of the third lens L3 is defined as R6. The camera optical lens 10 further satisfies a condition:

$-8.00 \leq (R5+R6)/(R5-R6) \leq -2.50$, which specifies a shape of the third lens L3. This condition can facilitate correction of an off-axis aberration.

An on-axis distance from the image side surface of the second lens L2 to the object side surface of the third lens L3 is defined as d4, and an on-axis thickness of the third lens L3 is defined as d5. The camera optical lens 10 further satisfies a condition: $2.50 \leq d5/d4 \leq 4.50$, which specifies a ratio of a thickness of the third lens L3 to an air gap between the second and third lenses. This condition facilitates to compress a total length of the optical system and achieve ultra-thinness.

A refractive index of the second lens L2 is defined as n2. The camera optical lens 10 further satisfies a condition: $1.55 \leq n2 \leq 1.70$, which specifies the refractive index of the second lens L2. This condition facilitates to improve the performance of the optical system.

An on-axis thickness of the first lens L1 is defined as d1, and an on-axis distance from the image side surface of the first lens L1 to the object side surface of the second lens L2 is defined as d2. The camera optical lens 10 further satisfies a condition: $1.50 \leq d1/d2 \leq 3.50$, which specifies a ratio of a thickness of the first lens L1 to an air gap between the first and second lenses. This condition facilitates to compress the total length of the optical system and achieve ultra-thinness.

A central curvature radius of an object side surface of the second lens L2 is defined as R3, and a central curvature radius of an image side surface of the second lens L2 is defined as R4. The camera optical lens 10 further satisfies a condition: $-3.00 \leq (R3+R4)/(R3-R4) \leq -1.50$, which specifies a shape of the second lens L2. This can facilitate correction of an on-axis aberration.

In this embodiment, the object side surface of the first lens L1 is convex at a paraxial position, and an image side surface of the first lens L1 is convex at a paraxial position.

A central curvature radius of the object side surface of the first lens L1 is defined as R1, and a central curvature radius of the image side surface of the first lens L1 is defined as R2. The camera optical lens 10 further satisfies a condition: $-1.72 \leq (R1+R2)/(R1-R2) \leq -0.21$. This condition can reasonably control a shape of the first lens L1 in such a manner that the first lens L1 can effectively correct spherical aberrations of the system. As an example, the camera optical lens further satisfies a condition: $-1.08 \leq (R1+R2)/(R1-R2) \leq -0.26$.

An on-axis thickness of the first lens L1 is defined as d1, and a total optical length from the object side surface of the first lens L1 to an image plane of the camera optical lens along an optic axis is defined as TTL. The camera optical lens 10 further satisfies a condition: $0.08 \leq d1/TTL \leq 0.44$. This condition can facilitate achieving ultra-thin lenses. As an example, the camera optical lens further satisfies a condition: $0.13 \leq d1/TTL \leq 0.35$.

The object side surface of the second lens L2 is concave at a paraxial position and the image side surface of the second lens L2 is convex at a paraxial position.

An on-axis thickness of the second lens L2 is defined as d3, and the total optical length from the object side surface of the first lens L1 to the image plane of the camera optical lens 10 along an optic axis is defined as TTL. The camera optical lens 10 further satisfies a condition: $0.03 \leq d3/TTL \leq 0.19$. This can facilitate achieving ultra-thinness. As an example, the camera optical lens further satisfies a condition: $0.04 \leq d3/TTL \leq 0.15$.

The object side surface of the third lens L3 is convex at a paraxial position and an image side surface being concave at a paraxial position.

An on-axis thickness of the third lens L3 is defined as d5, and the total optical length from the object side surface of the first lens L1 to the image plane of the camera optical lens 10 along an optic axis is defined as TTL. The camera optical lens 10 further satisfies a condition: $0.07 \leq d5/TTL \leq 0.46$. This condition can facilitate achieving ultra-thin lenses. As an example, the camera optical lens further satisfies a condition: $0.12 \leq d5/TTL \leq 0.37$.

In this embodiment, an image height of the camera optical lens 10 is defined as IH, and the total optical length from the object side surface of the first lens L1 to the image plane of the camera optical lens 10 along an optic axis is defined as TTL. The camera optical lens 10 further satisfies a condition: $TTL/IH \leq 1.65$. This condition can facilitate achieving ultra-thinness.

In this embodiment, a field of view (FOV) of the camera optical lens 10 is greater than or equal to 70°, thereby achieving a wide angle.

In this embodiment, an F number (FNO) of the camera optical lens 10 is smaller than or equal to 2.51. The camera optical lens 10 has a large aperture and better imaging performance. As an example, the F number (FNO) of the camera optical lens 10 is smaller than or equal to 2.47.

In this embodiment, the focal length of the camera optical lens 10 is defined as f, and a combined focal length of the first lens L1 and the second lens L2 is defined as f12. The camera optical lens 10 further satisfies a condition: $1.10 \leq f12/f \leq 4.37$. This can eliminate aberration and distortion of the camera optical lens 10, reduce the back focal length of the camera optical lens 10, and maintain miniaturization of the camera lens system group. As an example, the camera optical lens further satisfies a condition: $1.77 \leq f12/f \leq 3.50$.

When the above conditions are satisfied, the camera optical lens 10 will have high optical performance while satisfying design requirements for a large aperture, ultra-thinness, and a wide angle. With these characteristics, the camera optical lens 10 is especially suitable for camera optical lens assembly of mobile phones and WEB camera optical lenses formed by imaging elements such as CCD and CMOS for high pixels.

In the following, examples will be used to describe the camera optical lens 10 of the present invention. The symbols in each example will be described as follows. The focal length, on-axis distance, central curvature radius, on-axis thickness, inflection point position, and stagnation point position are all expressed in unit of mm.

TTL: Total optical length (on-axis distance from the object side surface of the first lens L1 to the image plane of the camera optical lens along the optic axis) in unit of mm.

F number (FNO): a ratio of an effective focal length of the camera optical lens to an entrance pupil diameter of the camera optical lens.

In an example, an inflection point and/or a stagnation point may be arranged on the object side surface and/or image side surface of the lens, so as to satisfy the demand for the high quality imaging. Specifically, please refer to the following description.

Table 1 and Table 2 show design data of the camera optical lens 10 according to Embodiment 1 of the present invention.

TABLE 1

|    | R      | d            | nd   |        | vd |       |
|----|--------|--------------|------|--------|----|-------|
| S1 | ∞      | d0 = −0.044  |      |        |    |       |
| R1 | 1.196  | d1 = 0.491   | nd1  | 1.5444 | v1 | 55.82 |
| R2 | −3.235 | d2 = 0.261   |      |        |    |       |
| R3 | −0.665 | d3 = 0.231   | nd2  | 1.6449 | v2 | 22.54 |
| R4 | −1.920 | d4 = 0.210   |      |        |    |       |
| R5 | 0.823  | d5 = 0.793   | nd3  | 1.5444 | v3 | 55.82 |
| R6 | 1.373  | d6 = 0.300   |      |        |    |       |
| R7 | ∞      | d7 = 0.210   | ndg  | 1.5168 | vg | 64.17 |
| R8 | ∞      | d8 = 0.372   |      |        |    |       |

In the table, meanings of various symbols will be defined as follows.

S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the optical filter GF;
R8: central curvature radius of the image side surface of the optical filter GF;
d: on-axis thickness of a lens, an on-axis distance between lenses;
  d0: on-axis distance from the aperture S1 to the object side surface of the first lens L1;
  d1: on-axis thickness of the first lens L1;
  d2: on-axis distance from the image side surface of the first lens L1 to the object side surface of the second lens L2;
  d3: on-axis thickness of the second lens L2;
  d4: on-axis distance from the image side surface of the second lens L2 to the object side surface of the third lens L3;
  d5: on-axis thickness of the third lens L3;
  d6: on-axis distance from the image side surface of the third lens L3 to the object side surface of the optical filter GF;
  d7: on-axis thickness of the optical filter GF;
  d8: on-axis distance from the image side surface of the optical filter GF to the image plane;
nd: refractive index of d line;
  nd1: refractive index of d line of the first lens L1;
  nd2: refractive index of d line of the second lens L2;
  nd3: refractive index of d line of the third lens L3;
  ndg: refractive index of d line of the optical filter GF;
vd: abbe number;
  v1: abbe number of the first lens L1;
  v2: abbe number of the second lens L2;
  v3: abbe number of the third lens L3;
  vg: abbe number of the optical filter GF.

Table 2 shows aspheric surface data of respective lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | 4.1202E−01 | −5.6227E−02 | −1.1051E+01 | 3.0868E+02 | −5.0421E+03 | 4.8672E+04 |
| R2 | −8.1263E−01 | −1.0048E+00 | −3.6961E+00 | 1.5157E+02 | −2.5252E+03 | 2.2595E+04 |
| R3 | 2.4300E−01 | −3.3547E+00 | 3.2317E+01 | −7.3646E+01 | −1.9985E+03 | 3.3393E+04 |
| R4 | 5.1650E+00 | −4.3506E+00 | 3.7175E+01 | −2.4653E+02 | 1.4382E+03 | −6.1533E+03 |
| R5 | −8.2064E+00 | −1.3527E+00 | 5.2548E+00 | −1.5728E+01 | 3.4951E+01 | −5.4439E+01 |
| R6 | −5.8478E−01 | −6.6133E−01 | 7.2546E−01 | −6.0733E−01 | 2.0276E−01 | 1.6103E−01 |

| | Cone coefficient | Aspherical coefficient | | | |
|---|---|---|---|---|---|
| | k | A14 | A16 | A18 | A20 |
| R1 | 4.1202E−01 | −2.8888E+05 | 1.0400E+06 | −2.1030E+06 | 1.8518E+06 |
| R2 | −8.1263E−01 | −1.2045E+05 | 3.8885E+05 | −7.0764E+05 | 5.5780E+05 |
| R3 | 2.4300E−01 | −2.4104E+05 | 9.4445E+05 | −1.9697E+06 | 1.7240E+06 |
| R4 | 5.1650E+00 | 1.8931E+04 | −3.9438E+04 | 4.8373E+04 | −2.5831E+04 |
| R5 | −8.2064E+00 | 5.6748E+01 | −3.7431E+01 | 1.4064E+01 | −2.2861E+00 |
| R6 | −5.8478E−01 | −2.3901E−01 | 1.3050E−01 | −3.5193E−02 | 3.8776E−03 |

In Table 2, k represents a cone coefficient, and A4, A6, A8, A10, A12, A14, A16, A18 and A20 represent aspherical coefficients.

$$y = (x^2/R)/\{1+[1-(k+1)(x^2/R^2)]^{1/2}\} + A4x^4 + A6x^6 + A8x^8 + A10x^{10} + A12x^{12} + A14x^{14} + A16x^{16} + A18x^{18} + A20x^{20} \quad (1)$$

In the equation (1), x represents a vertical distance between a point on an aspherical curve and the optic axis, and y represents an aspherical depth (a vertical distance between a point on an aspherical surface, having a distance of x from the optic axis, and a surface tangent to a vertex of the aspherical surface on the optic axis).

For convenience, an aspheric surface of each lens surface uses the aspheric surfaces shown in the above equation (1). However, the present invention is not limited to the aspherical polynomial form shown in the equation (1).

Table 3 and Table 4 show design data of inflection points and stagnation points of respective lenses in the camera optical lens 10 according to Embodiment 1 of the present invention. P1R1 and P1R2 represent the object side surface and the image side surface of the first lens L1, respectively; P2R1 and P2R2 represent the object side surface and the image side surface of the second lens L2, respectively; and P3R1 and P3R2 represent the object side surface and the image side surface of the third lens L3, respectively. The data in the column named "inflection point position" refers to a vertical distance from an inflection point arranged on each lens surface to the optic axis of the camera optical lens 10. The data in the column named "stagnation point position" refers to a vertical distance from a stagnation point arranged on each lens surface to the optic axis of the camera optical lens 10. The data in the column named "number of inflection points" refers to the number of inflection points set on the surface of each lens. The data in the column named "number of stagnation points" refers to the number of stagnation points set on the surface of each lens.

TABLE 3

| | Number of inflection points | Inflection point position 1 | Inflection point position 2 | Inflection point position 3 |
|---|---|---|---|---|
| P1R1 | 2 | 0.375 | 0.475 | / |
| P1R2 | 0 | / | / | / |
| P2R1 | 1 | 0.375 | / | / |
| P2R2 | 1 | 0.385 | / | / |
| P3R1 | 3 | 0.255 | 1.025 | 1.095 |
| P3R2 | 2 | 0.375 | 1.485 | / |

TABLE 4

| | Number of stagnation points | Stagnation point position 1 |
|---|---|---|
| P1R1 | 0 | / |
| P1R2 | 0 | / |
| P2R1 | 0 | / |
| P2R2 | 1 | 0.535 |
| P3R1 | 1 | 0.705 |
| P3R2 | 1 | 0.795 |

Figure 2:
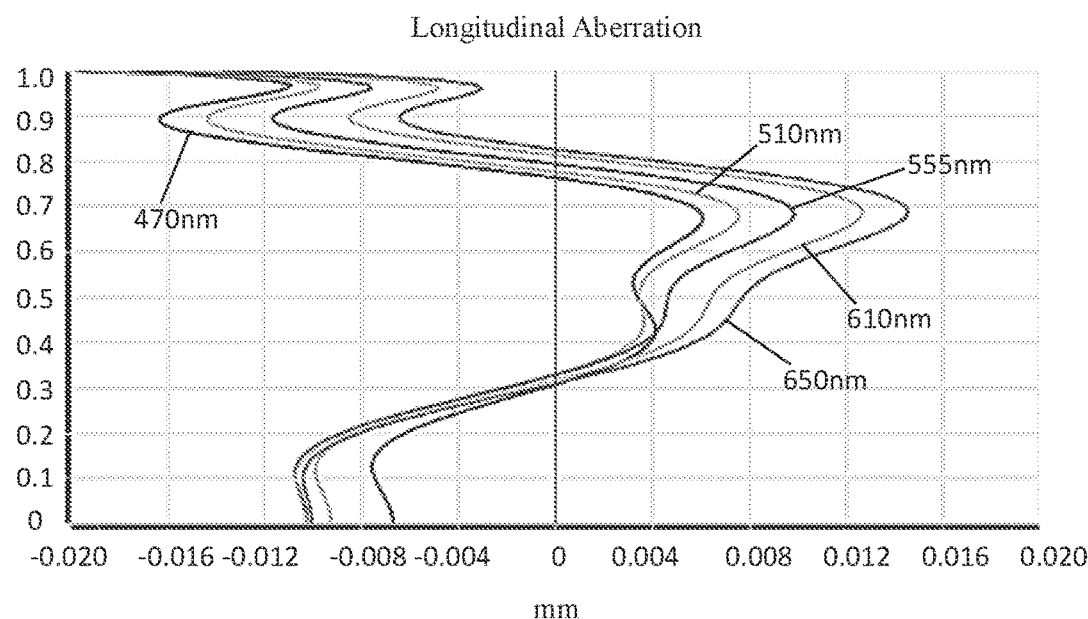
FIG. 2 is a schematic diagram of a longitudinal aberration of the camera optical lens shown in FIG. 1.
Figure 3:
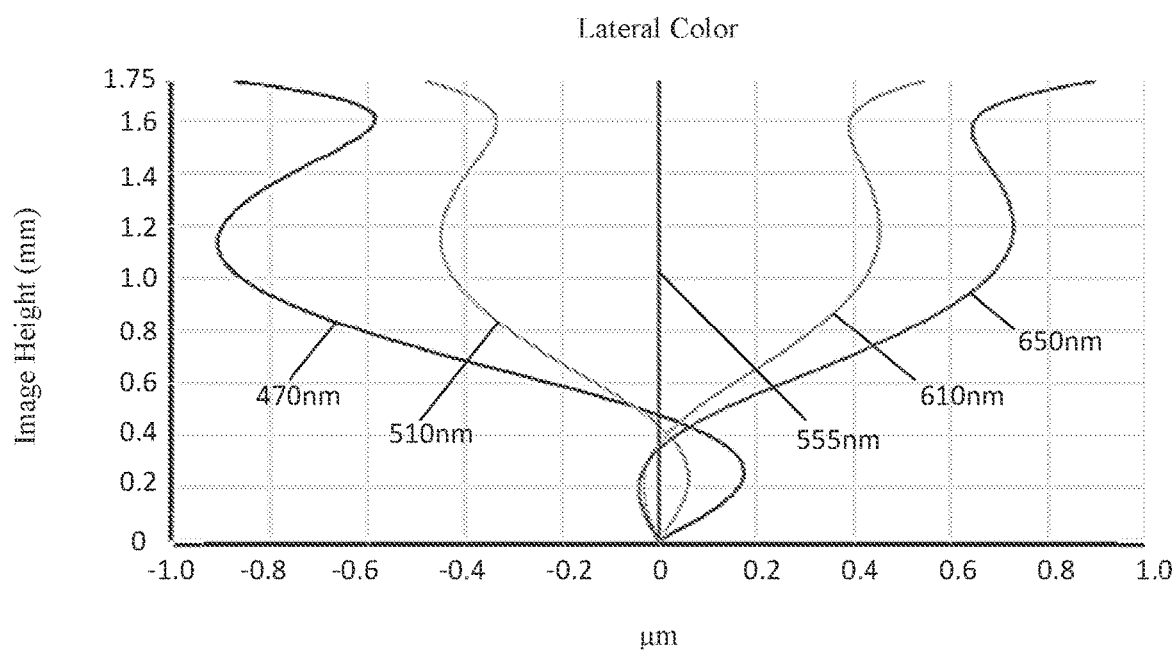
FIG. 3 is a schematic diagram of a lateral color of the camera optical lens shown in FIG. 1.
Figure 4:
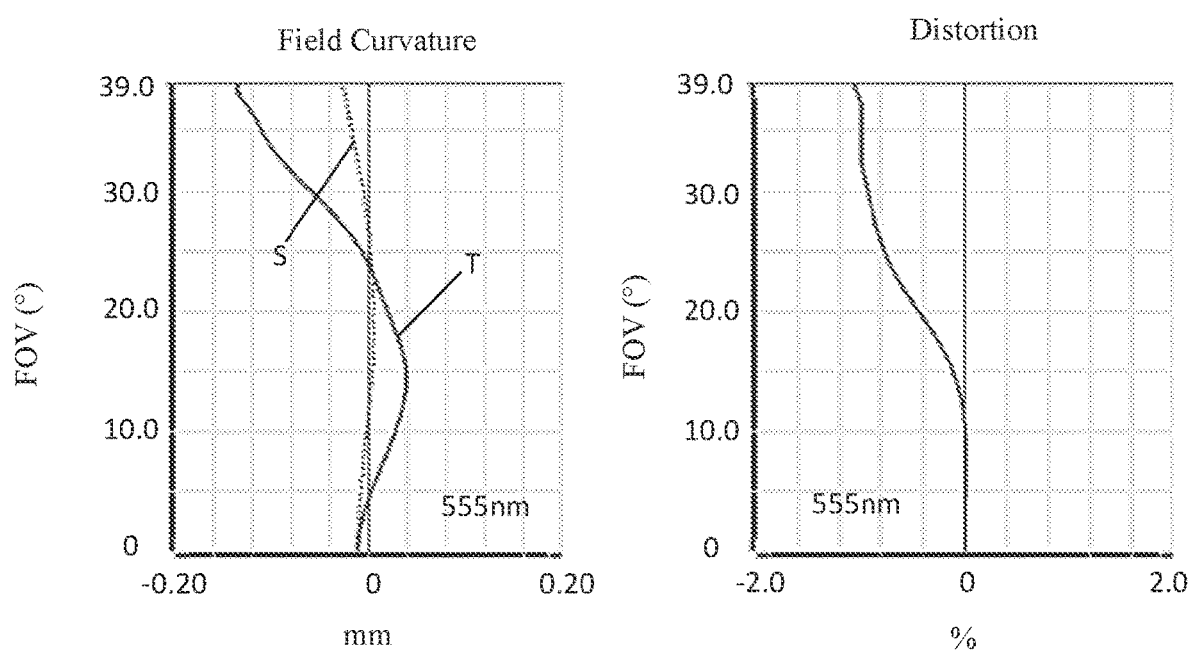
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm, and 470 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a meridian direction.

Table 37 below lists various values and values corresponding to parameters specified in the above conditions for each of Embodiments 1-9.

As shown in Table 37, Embodiment 1 satisfies respective conditions.

In this embodiment, the entrance pupil diameter ENPD of the camera optical lens is 0.886 mm. The full field of view image height IH is 1.750 mm. The field of view (FOV) is 78.00°. Thus, the camera optical lens 10 can achieve ultra-thinness and a wide angle lenses while having on-axis and off-axis aberrations sufficiently corrected, thereby leading to better optical characteristics.

Embodiment 2

Figure 5:
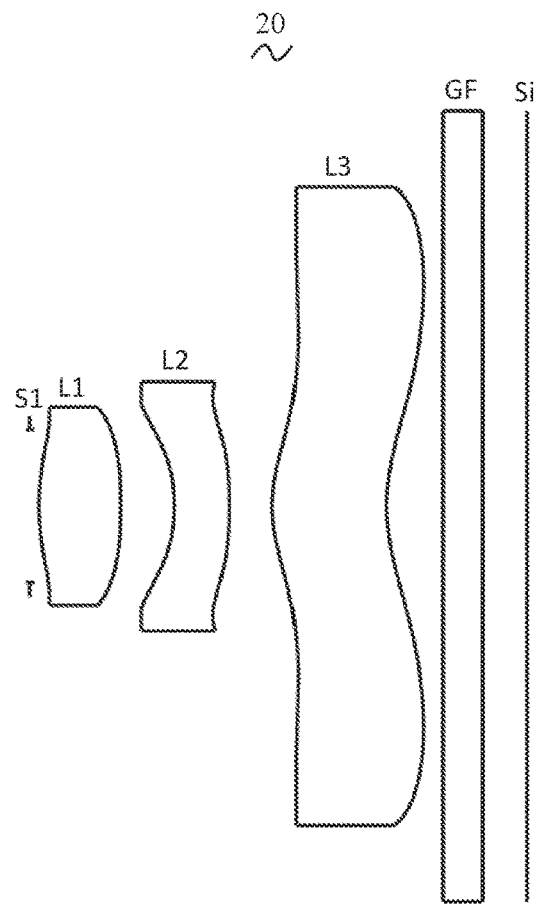
FIG. 5 is a schematic structural diagram of a camera optical lens according to Embodiment 2 of the present invention.

Embodiment 2 is basically the same as Embodiment 1 and involves symbols having the same meanings as Embodiment 1, and only differences from Embodiment 1 will be described in the following. FIG. 5 shows a camera optical lens 20 according to Embodiment 2 of the present invention.

Table 5 and Table 6 show design data of the camera optical lens 20 in Embodiment 2 of the present invention.

TABLE 5

| | R | d | nd | | vd |
|---|---|---|---|---|---|
| S1 | ∞ | d0 = 0.049 | | | |
| R1 | 1.249 | d1 = 0.434 | nd1 | 1.5444 | v1 55.82 |
| R2 | −2.382 | d2 = 0.285 | | | |
| R3 | −0.827 | d3 = 0.291 | nd2 | 1.6449 | v2 22.54 |
| R4 | −4.008 | d4 = 0.227 | | | |
| R5 | 0.661 | d5 = 0.606 | nd3 | 1.5444 | v3 55.82 |
| R6 | 0.965 | d6 = 0.300 | | | |
| R7 | ∞ | d7 = 0.210 | ndg | 1.5168 | vg 64.17 |
| R8 | ∞ | d8 = 0.236 | | | |

Table 6 shows aspheric surface data of respective lenses in the camera optical lens 20 according to Embodiment 2 of the present invention.

TABLE 6

| | Cone coefficient | Aspherical coefficient | | | | |
|---|---|---|---|---|---|---|
| | k | A4 | A6 | A8 | A10 | A12 |
| R1 | −5.4441E−01 | −2.7306E−01 | −6.7196E−01 | −3.5562E+00 | −1.2227E+02 | 3.3734E+03 |
| R2 | 6.4037E−01 | −8.2094E−01 | −3.1659E+00 | 8.6780E+01 | −1.5487E+03 | 1.6029E+04 |
| R3 | 4.2371E−01 | −2.0914E+00 | 2.3161E+01 | −2.1530E+02 | 1.5941E+03 | −6.2987E+03 |
| R4 | 1.5441E+01 | −3.4527E+00 | 2.7527E+01 | −1.8527E+02 | 1.0463E+03 | −4.2118E+03 |
| R5 | −6.4038E+00 | −3.6110E−01 | −3.2388E−01 | 1.6094E+00 | −1.4654E+00 | −8.6233E−01 |
| R6 | −1.0336E+00 | −5.5215E−01 | 1.5216E−01 | 4.4984E−01 | −7.7647E−01 | 6.4409E−01 |

| | Cone coefficient | Aspherical coefficient | | | |
|---|---|---|---|---|---|
| | k | A14 | A16 | A18 | A20 |
| R1 | −5.4441E−01 | −4.1472E+04 | 2.6566E+05 | −8.7331E+05 | 1.1452E+06 |
| R2 | 6.4037E−01 | −1.0045E+05 | 3.7533E+05 | −7.7015E+05 | 6.6620E+05 |
| R3 | 4.2371E−01 | 9.8218E+03 | 1.1054E+04 | −5.8199E+04 | 5.5822E+04 |
| R4 | 1.5441E+01 | 1.1911E+04 | −2.2529E+04 | 2.5261E+04 | −1.2566E+04 |
| R5 | −6.4038E+00 | 2.7518E+00 | −2.2627E+00 | 8.4542E−01 | −1.2332E−01 |
| R6 | −1.0336E+00 | −3.2129E−01 | 9.6717E−02 | −1.6020E−02 | 1.1036E−03 |

Table 7 and Table 8 show design data of inflection points and stagnation points of respective lenses in the camera optical lens 20 according to Embodiment 2 of the present invention.

TABLE 7

|  | Number of inflection points | Inflection point position 1 | Inflection point position 2 | Inflection point position 3 |
|---|---|---|---|---|
| P1R1 | 1 | 0.325 | / | / |
| P1R2 | 0 | / | / | / |
| P2R1 | 1 | 0.405 | / | / |
| P2R2 | 1 | 0.405 | / | / |
| P3R1 | 3 | 0.325 | 0.995 | 1.135 |
| P3R2 | 1 | 0.455 | / | / |

TABLE 8

|  | Number of stagnation points | Stagnation point position 1 |
|---|---|---|
| P1R1 | 0 | / |
| P1R2 | 0 | / |
| P2R1 | 0 | / |
| P2R2 | 1 | 0.555 |
| P3R1 | 1 | 0.865 |
| P3R2 | 1 | 1.125 |

Figure 6:
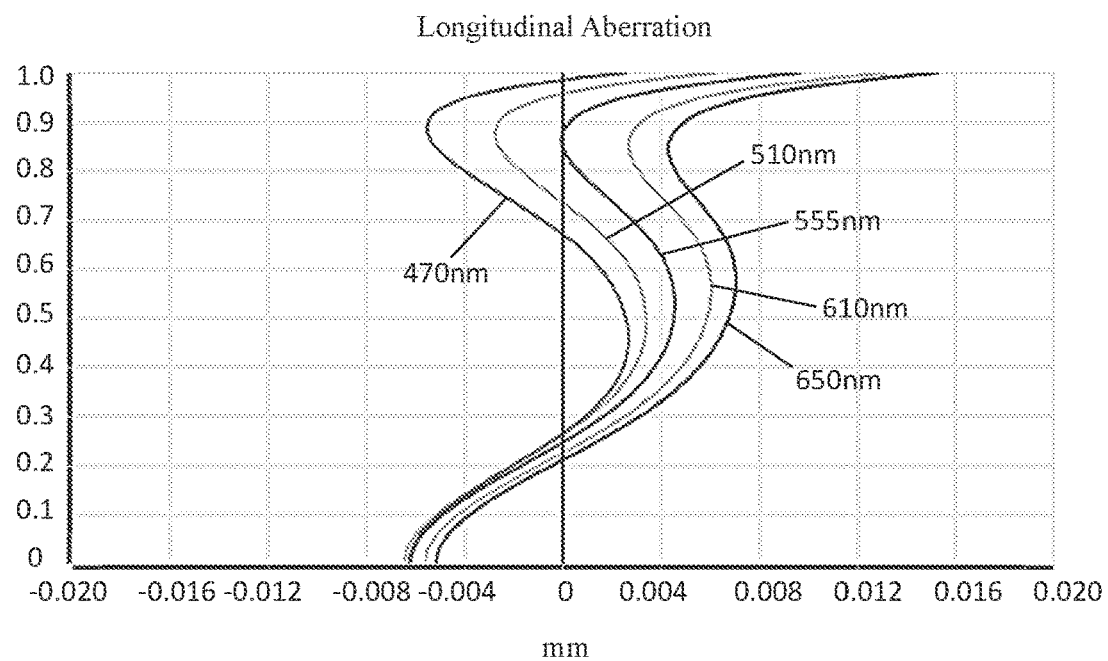
FIG. 6 is a schematic diagram of a longitudinal aberration of the camera optical lens shown in FIG. 5.
Figure 7:
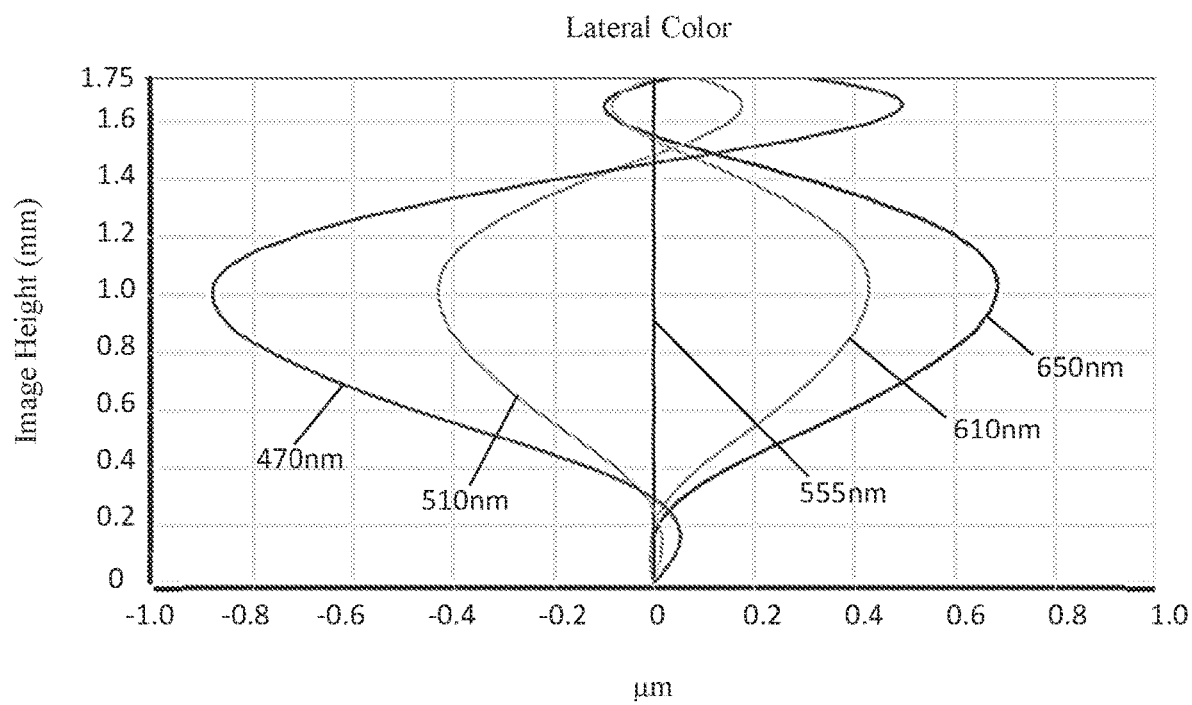
FIG. 7 is a schematic diagram of a lateral color of the camera optical lens shown in FIG. 5.
Figure 8:
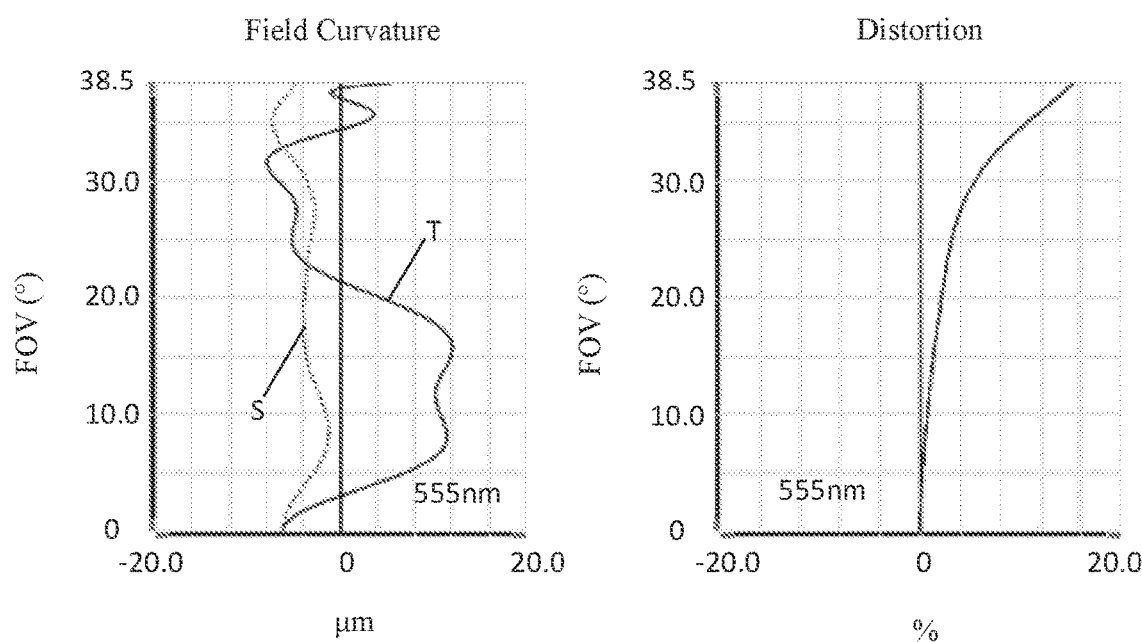
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm, and 470 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 37, Embodiment 2 satisfies respective conditions.

In this embodiment, the entrance pupil diameter ENPD of the camera optical lens is 0.775 mm. The full field of view image height IH is 1.750 mm. The field of view (FOV) is 77.00°. Thus, the camera optical lens 20 can achieve ultra-thinness and a wide angle while having on-axis and off-axis aberrations sufficiently corrected, thereby leading to better optical characteristics.

Embodiment 3

Figure 9:
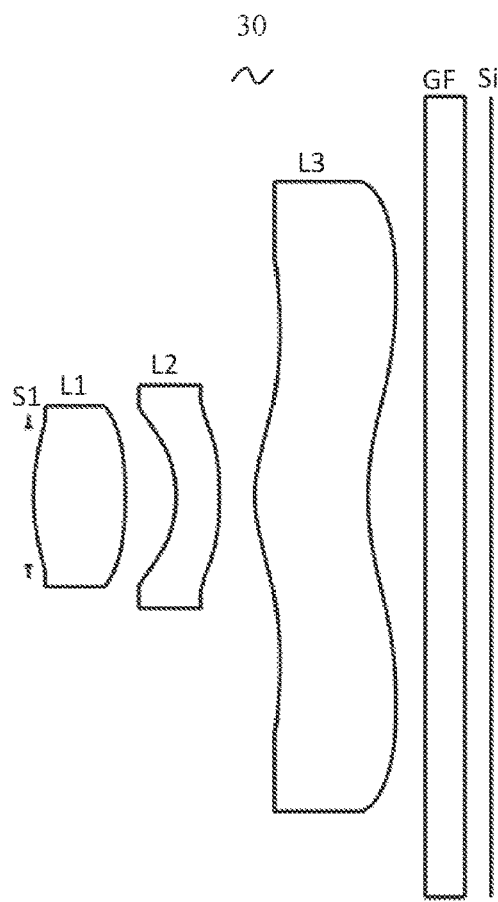
FIG. 9 is a schematic structural diagram of a camera optical lens according to Embodiment 3 of the present invention.

Embodiment 3 is basically the same as Embodiment 1 and involves symbols having the same meanings as Embodiment 1, and only differences from Embodiment 1 will be described in the following. FIG. 9 shows a camera optical lens 30 according to Embodiment 3 of the present invention.

Table 9 and Table 10 show design data of the camera optical lens 30 in Embodiment 3 of the present invention.

TABLE 9

|  | R | d | nd | vd |
|---|---|---|---|---|
| S1 | ∞ | d0 = 0.026 |  |  |
| R1 | 1.040 | d1 = 0.482 | nd1 | 1.5444 | v1 | 55.82 |
| R2 | −2.083 | d2 = 0.267 |  |  |
| R3 | −0.590 | d3 = 0.229 | nd2 | 1.6860 | v2 | 31.05 |
| R4 | −2.071 | d4 = 0.186 |  |  |
| R5 | 0.656 | d5 = 0.592 | nd3 | 1.5444 | v3 | 55.82 |
| R6 | 1.502 | d6 = 0.300 |  |  |
| R7 | ∞ | d7 = 0.210 | ndg | 1.5168 | vg | 64.17 |
| R8 | ∞ | d8 = 0.138 |  |  |

Table 10 shows aspheric surface data of respective lenses in the camera optical lens 30 according to Embodiment 3 of the present invention.

TABLE 10

|  | Cone coefficient | Aspherical coefficient | | | | |
|---|---|---|---|---|---|---|
|  | k | A4 | A6 | A8 | A10 | A12 |
| R1 | 2.5924E−02 | −3.2266E−01 | 2.1458E−01 | −3.3839E+01 | 2.4403E+02 | 2.9359E+03 |
| R2 | 9.7986E+00 | −6.7624E−01 | −1.7857E+01 | 4.5551E+02 | −7.6121E+03 | 8.0986E+04 |
| R3 | 1.1468E−01 | −2.7591E+00 | 3.2334E+01 | −4.2309E+02 | 4.6840E+03 | −2.3478E+04 |
| R4 | −2.2679E+00 | −4.2336E+00 | 4.0254E+01 | −3.8836E+02 | 3.1806E+03 | −1.7750E+04 |
| R5 | −9.7471E+00 | 5.4517E−01 | −6.6939E+00 | 2.5968E+01 | −5.8484E+01 | 8.4467E+01 |
| R6 | −6.5132E−01 | 3.8043E−01 | −3.1079E+00 | 7.0375E+00 | −9.0677E+00 | 7.3174E+00 |

|  | Cone coefficient | Aspherical coefficient | | | |
|---|---|---|---|---|---|
|  | k | A14 | A16 | A18 | A20 |
| R1 | 2.5924E−02 | −8.3092E+04 | 7.4057E+05 | −3.0745E+06 | 4.9146E+06 |
| R2 | 9.7986E+00 | −5.4591E+05 | 2.2567E+06 | −5.2224E+06 | 5.1742E+06 |
| R3 | 1.1468E−01 | 2.8920E+04 | 1.8685E+05 | −7.4816E+05 | 8.0920E+05 |
| R4 | −2.2679E+00 | 6.7647E+04 | −1.6897E+05 | 2.4590E+05 | −1.5627E+05 |
| R5 | −9.7471E+00 | −7.9164E+01 | 4.6442E+01 | −1.5443E+01 | 2.2137E+00 |
| R6 | −6.5132E−01 | −3.7438E+00 | 1.1742E+00 | −2.0506E−01 | 1.5194E−02 |

Table 11 and Table 12 show design data of inflection points and stagnation points of respective lenses in the camera optical lens 30 according to Embodiment 3 of the present invention.

TABLE 11

|  | Number of inflection points | Inflection point position 1 | Inflection point position 2 | Inflection point position 3 |
|---|---|---|---|---|
| P1R1 | 1 | 0.325 | / | / |
| P1R2 | 0 | / | / | / |
| P2R1 | 1 | 0.385 | / | / |
| P2R2 | 1 | 0.375 | / | / |
| P3R1 | 3 | 0.315 | 1.025 | 1.055 |
| P3R2 | 1 | 0.455 | / | / |

TABLE 12

| | Number of stagnation points | Stagnation point position 1 |
|---|---|---|
| P1R1 | 0 | / |
| P1R2 | 0 | / |
| P2R1 | 0 | / |
| P2R2 | 1 | 0.515 |
| P3R1 | 1 | 0.835 |
| P3R2 | 1 | 1.035 |

Figure 10:
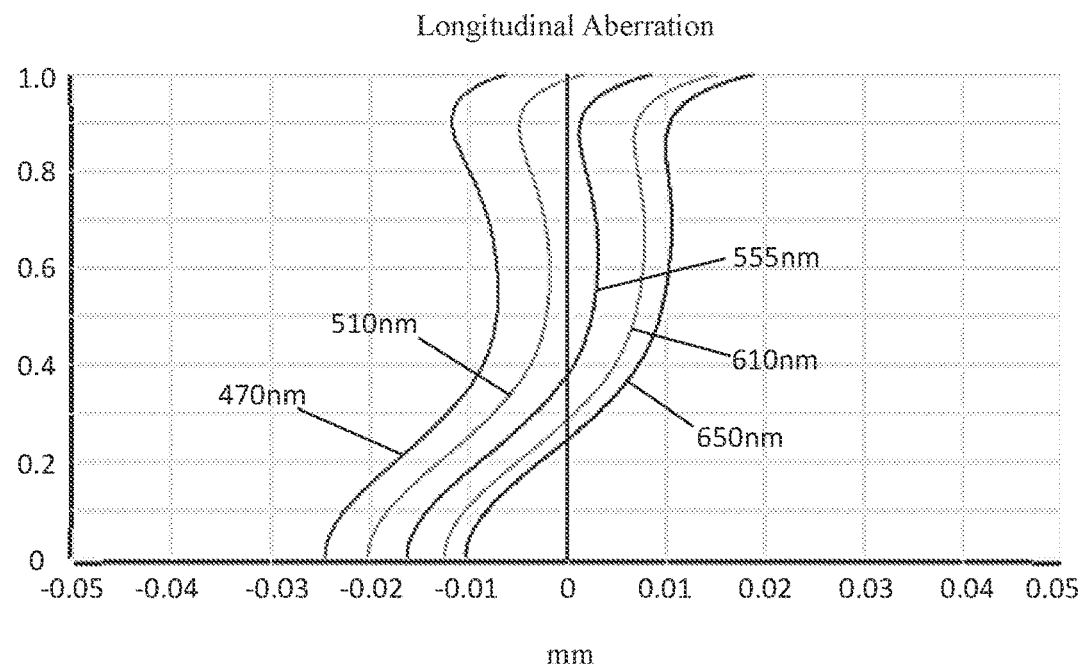
FIG. 10 is a schematic diagram of a longitudinal aberration of the camera optical lens shown in FIG. 9.
Figure 11:
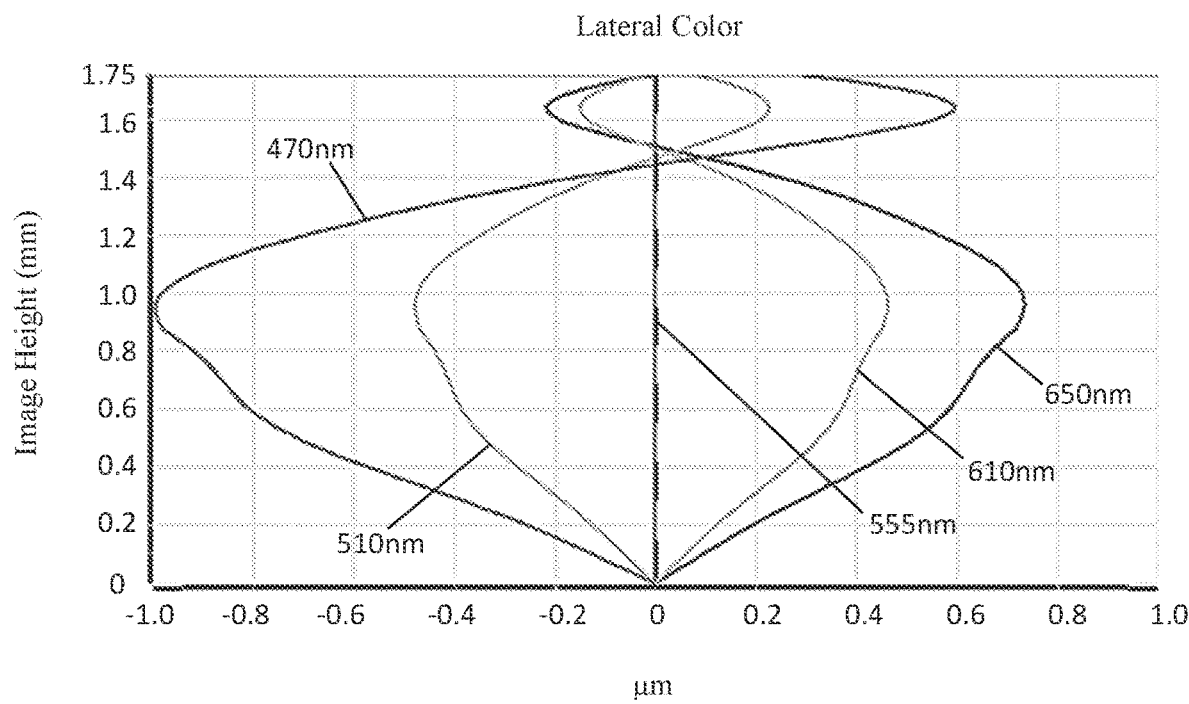
FIG. 11 is a schematic diagram of a lateral color of the camera optical lens shown in FIG. 9.
Figure 12:
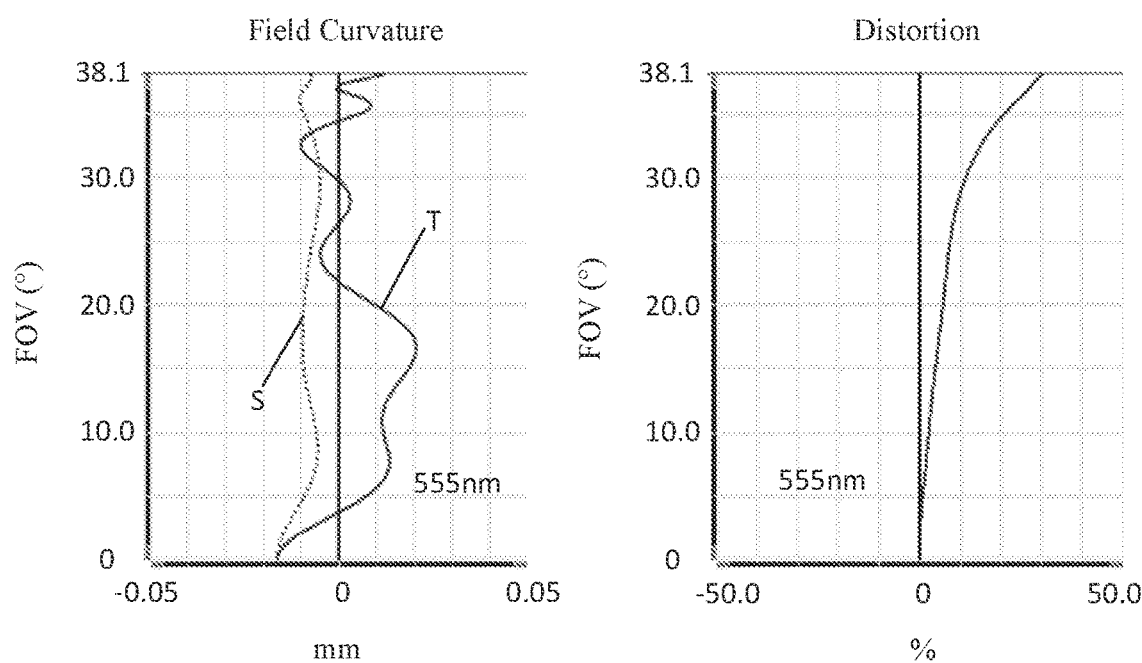
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm, and 470 nm after passing the camera optical lens 30 according to Embodiment 3. FIG. 12 illustrates a field curvature and a distortion of light with a wavelength of 555 nm after passing the camera optical lens 30 according to Embodiment 3.

Table 37 below further lists values corresponding to various conditions in the present embodiment according to the above conditions. It can be seen that the camera optical lens according to this embodiment satisfies the above conditions.

In this embodiment, the entrance pupil diameter ENPD of the camera optical lens is 0.693 mm. The full field of view image height IH is 1.750 mm. The field of view (FOV) in a diagonal direction is 76.20°. Thus, the camera optical lens 30 can achieve ultra-thinness and a wide angle while having on-axis and off-axis aberrations sufficiently corrected, thereby leading to better optical characteristics.

Embodiment 4

Figure 13:
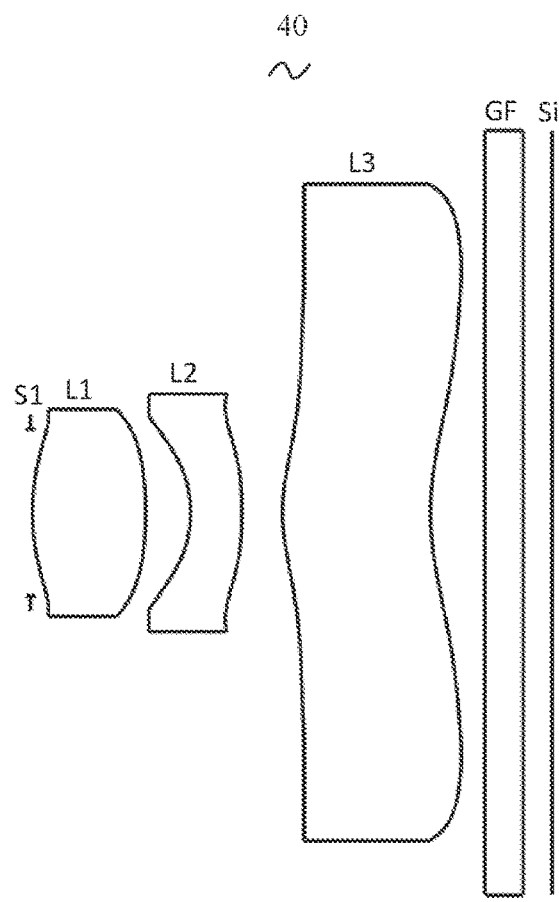
FIG. 13 is a schematic structural diagram of a camera optical lens according to Embodiment 4 of the present invention.

Embodiment 4 is basically the same as Embodiment 1 and involves symbols having the same meanings as Embodiment 1, and only differences from Embodiment 1 will be described in the following. FIG. 13 shows a camera optical lens 40 according to Embodiment 4 of the present invention.

Table 13 and Table 14 show design data of the camera optical lens 40 in Embodiment 4 of the present invention.

TABLE 13

| | R | d | nd | | vd | |
|---|---|---|---|---|---|---|
| S1 | ∞ | d0 = 0.009 | | | | |
| R1 | 1.096 | d1 = 0.622 | nd1 | 1.5444 | v1 | 55.82 |
| R2 | −2.094 | d2 = 0.248 | | | | |
| R3 | −0.636 | d3 = 0.283 | nd2 | 1.6859 | v2 | 31.06 |
| R4 | −2.502 | d4 = 0.223 | | | | |
| R5 | 0.831 | d5 = 0.812 | nd3 | 1.5444 | v3 | 55.82 |
| R6 | 1.374 | d6 = 0.300 | | | | |
| R7 | ∞ | d7 = 0.210 | ndg | 1.5168 | vg | 64.17 |
| R8 | ∞ | d8 = 0.159 | | | | |

Table 14 shows aspheric surface data of respective lenses in the camera optical lens 40 according to Embodiment 4 of the present invention.

TABLE 14

| | Cone coefficient | Aspherical coefficient | | | | |
|---|---|---|---|---|---|---|
| | k | A4 | A6 | A8 | A10 | A12 |
| R1 | 2.3019E−01 | −1.9026E−01 | 6.9812E−01 | −4.3673E+01 | 8.4303E+02 | −1.0024E+04 |
| R2 | 7.9269E+00 | −7.5905E−01 | −2.8194E+00 | 5.7298E+01 | −7.0285E+02 | 5.3669E+03 |
| R3 | 1.1935E−01 | −2.3124E+00 | 2.8194E+01 | −3.1053E+02 | 3.0888E+03 | −1.8513E+04 |
| R4 | 3.7735E+00 | −3.0086E+00 | 2.3921E+01 | −1.5145E+02 | 8.1572E+02 | −3.0021E+03 |
| R5 | −9.5221E+00 | −5.1544E−01 | 6.5558E−01 | −4.7479E−01 | 1.2654E+00 | −3.6099E+00 |
| R6 | −5.3171E−01 | −3.6992E−01 | 1.1548E−01 | 8.6571E−02 | −8.6016E−02 | −2.6646E−03 |
| | Cone coefficient | Aspherical coefficient | | | | |
| | k | A14 | A16 | A18 | A20 | |
| R1 | 2.3019E−01 | 7.2745E+04 | −3.1772E+05 | 7.6567E+05 | −7.8759E+05 | |
| R2 | 7.9269E+00 | −2.5485E+04 | 7.3251E+04 | −1.1716E+05 | 8.0038E+04 | |
| R3 | 1.1935E−01 | 6.4927E+04 | −1.2733E+05 | 1.1898E+05 | −2.7812E+04 | |
| R4 | 3.7735E+00 | 7.4243E+03 | −1.2231E+04 | 1.2341E+04 | −5.7708E+03 | |
| R5 | −9.5221E+00 | 5.0579E+00 | −3.7006E+00 | 1.3822E+00 | −2.0927E−01 | |
| R6 | −5.3171E−01 | 3.3551E−02 | −1.8284E−02 | 4.2734E−03 | −3.8892E−04 | |

Table 15 and Table 16 show design data of inflection points and stagnation points of respective lenses in the camera optical lens 40 according to Embodiment 4 of the present invention.

TABLE 15

| | Number of inflection points | Inflection point position 1 | Inflection point position 2 | Inflection point position 3 |
|---|---|---|---|---|
| P1R1 | 1 | 0.395 | / | / |
| P1R2 | 0 | / | / | / |
| P2R1 | 0 | / | / | / |
| P2R2 | 1 | 0.395 | / | / |
| P3R1 | 3 | 0.305 | 0.935 | 1.155 |
| P3R2 | 1 | 0.485 | / | / |

TABLE 16

| | Number of stagnation points | Stagnation point position 1 |
|---|---|---|
| P1R1 | 0 | / |
| P1R2 | 0 | / |
| P2R1 | 0 | / |
| P2R2 | 1 | 0.555 |
| P3R1 | 1 | 1.225 |
| P3R2 | 1 | 1.275 |

Figure 14:
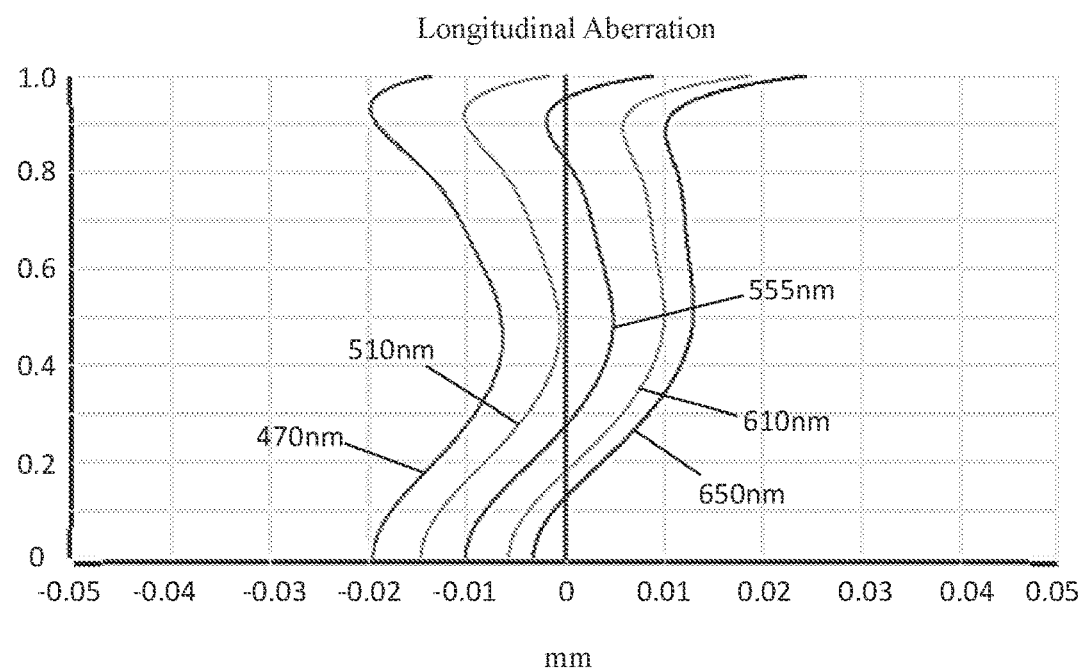
FIG. 14 is a schematic diagram of a longitudinal aberration of the camera optical lens shown in FIG. 13.
Figure 15:
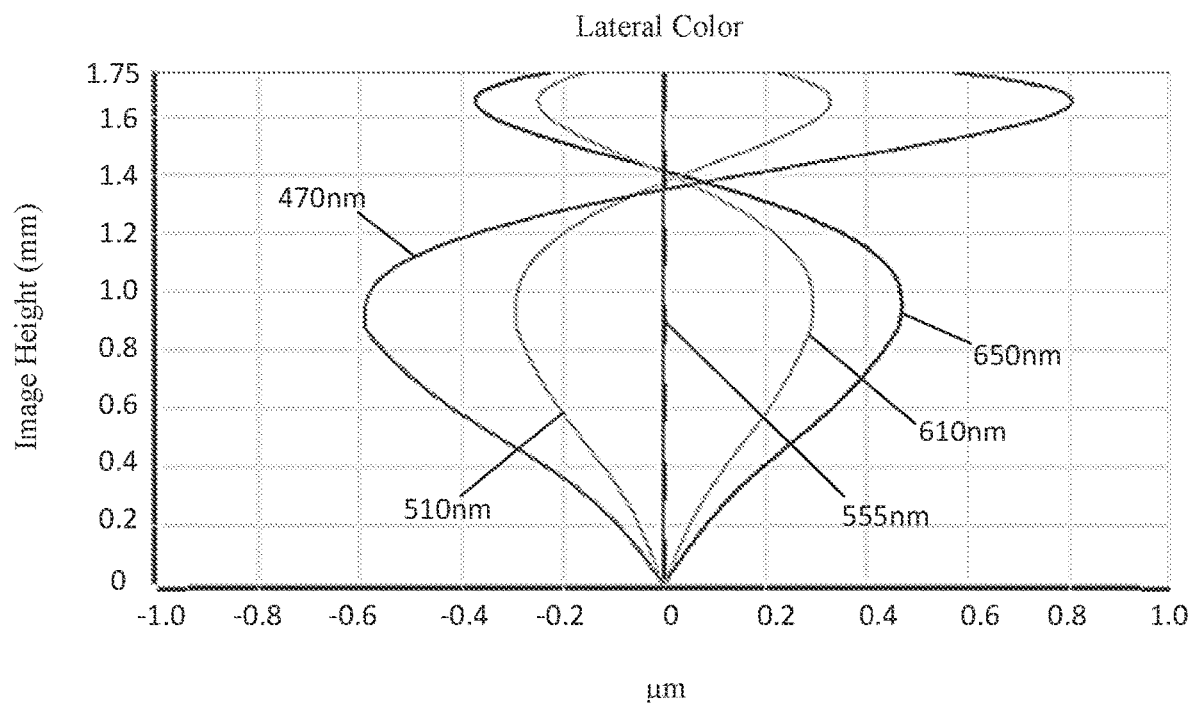
FIG. 15 is a schematic diagram of a lateral color of the camera optical lens shown in FIG. 13.
Figure 16:
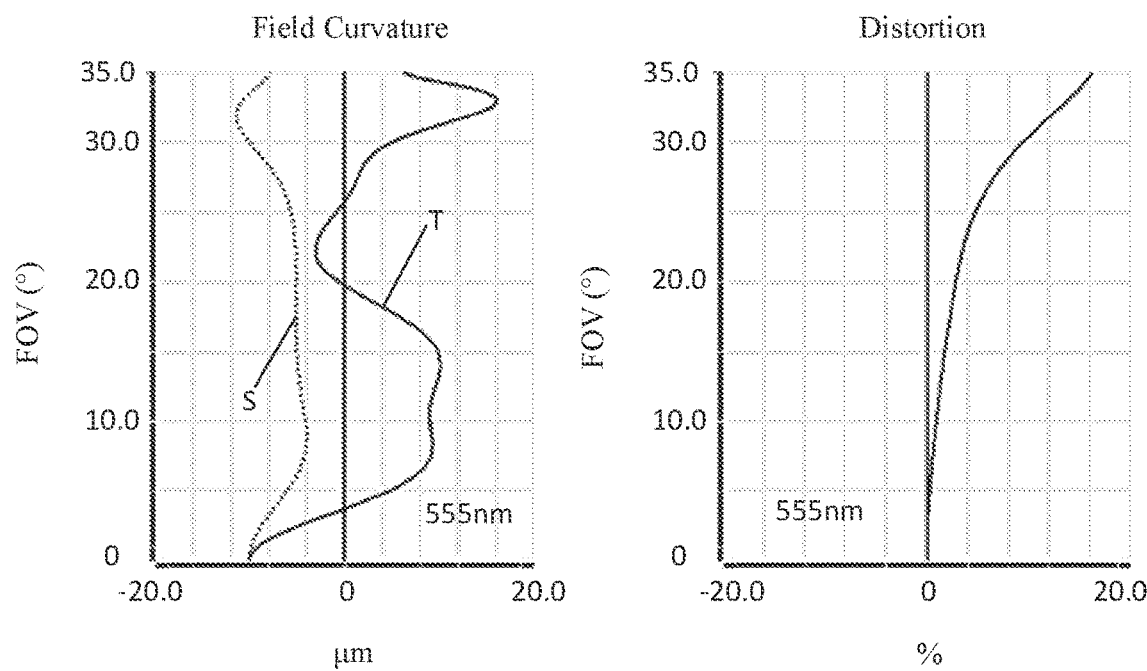
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 650 nm, 610 nm, 555 nm, 510 nm, and 470 nm after passing the camera optical lens 40 according to Embodiment 4. FIG. 16 illustrates a field curvature and a distortion of light with a wavelength of 555 nm after passing the camera optical lens 40 according to Embodiment 4.

Table 37 below further lists values corresponding to various conditions in the present embodiment according to the above conditions. It can be seen that the camera optical lens according to this embodiment satisfies the above conditions.

In this embodiment, the entrance pupil diameter ENPD of the camera optical lens is 0.871 mm. The full field of view image height IH is 1.750 mm. The field of view (FOV) is 70.00°. Thus, the camera optical lens 40 can achieve ultra-thinness and a wide angle while having on-axis and off-axis aberrations sufficiently corrected, thereby leading to better optical characteristics.

Embodiment 5

Figure 17:
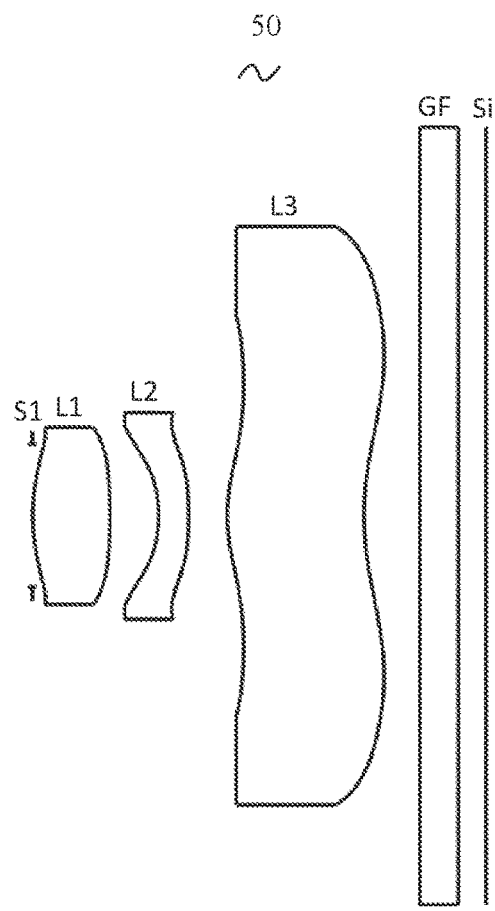
FIG. 17 is a schematic structural diagram of a camera optical lens according to Embodiment 5 of the present invention.

Embodiment 5 is basically the same as Embodiment 1 and involves symbols having the same meanings as Embodiment 1, and only differences from Embodiment 1 will be described in the following. FIG. 17 shows a camera optical lens 50 according to Embodiment 5 of the present invention.

Table 17 and Table 18 show design data of the camera optical lens 50 in Embodiment 5 of the present invention.

TABLE 17

|    | R      | d          | nd  |        | vd |       |
|----|--------|------------|-----|--------|----|-------|
| S1 | ∞      | d0 = 0.002 |     |        |    |       |
| R1 | 0.999  | d1 = 0.417 | nd1 | 1.5444 | v1 | 55.82 |
| R2 | -3.800 | d2 = 0.264 |     |        |    |       |
| R3 | -0.672 | d3 = 0.162 | nd2 | 1.6860 | v2 | 31.05 |
| R4 | -1.984 | d4 = 0.209 |     |        |    |       |
| R5 | 0.757  | d5 = 0.737 | nd3 | 1.5444 | v3 | 55.82 |
| R6 | 1.515  | d6 = 0.300 |     |        |    |       |
| R7 | ∞      | d7 = 0.210 | ndg | 1.5168 | vg | 64.17 |
| R8 | ∞      | d8 = 0.149 |     |        |    |       |

Table 18 shows aspheric surface data of respective lenses in the camera optical lens 50 according to Embodiment 5 of the present invention.

Table 19 and Table 20 show design data of inflection points and stagnation points of respective lenses in the camera optical lens 50 according to Embodiment 5 of the present invention.

TABLE 19

|      | Number of inflection points | Inflection point position 1 |
|------|---|-------|
| P1R1 | 1 | 0.335 |
| P1R2 | 0 | /     |
| P2R1 | 1 | 0.355 |
| P2R2 | 1 | 0.355 |
| P3R1 | 1 | 0.285 |
| P3R2 | 1 | 0.425 |

TABLE 20

|      | Number of stagnation points | Stagnation point position 1 |
|------|---|-------|
| P1R1 | 0 | /     |
| P1R2 | 0 | /     |
| P2R1 | 0 | /     |
| P2R2 | 1 | 0.475 |
| P3R1 | 1 | 0.675 |
| P3R2 | 1 | 0.825 |

Figure 18:
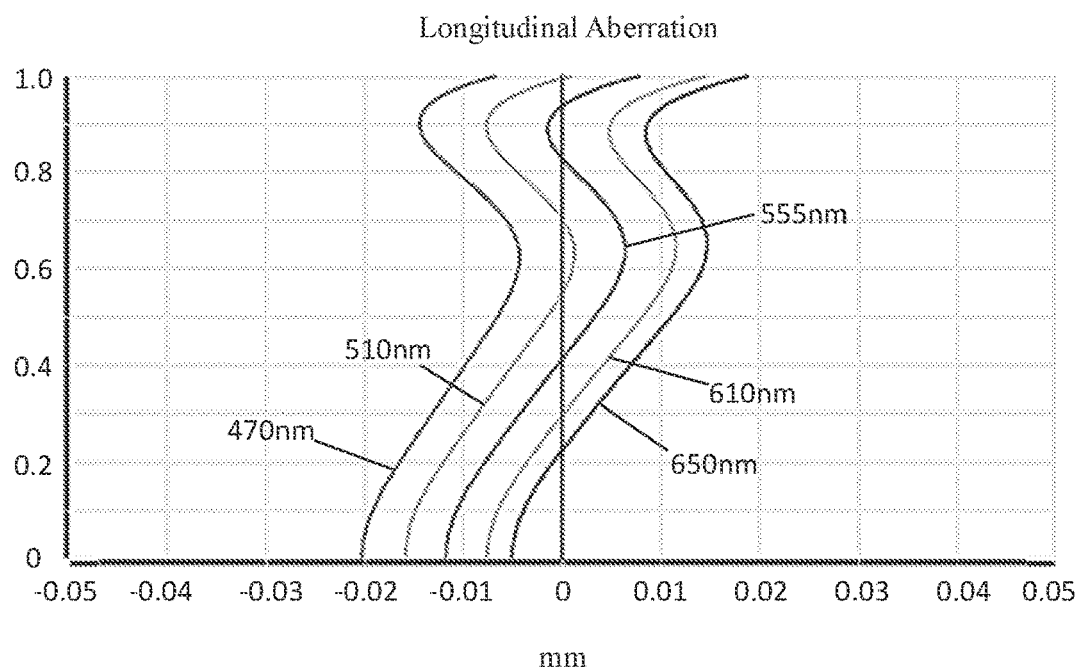
FIG. 18 is a schematic diagram of a longitudinal aberration of the camera optical lens shown in FIG. 17.
Figure 19:
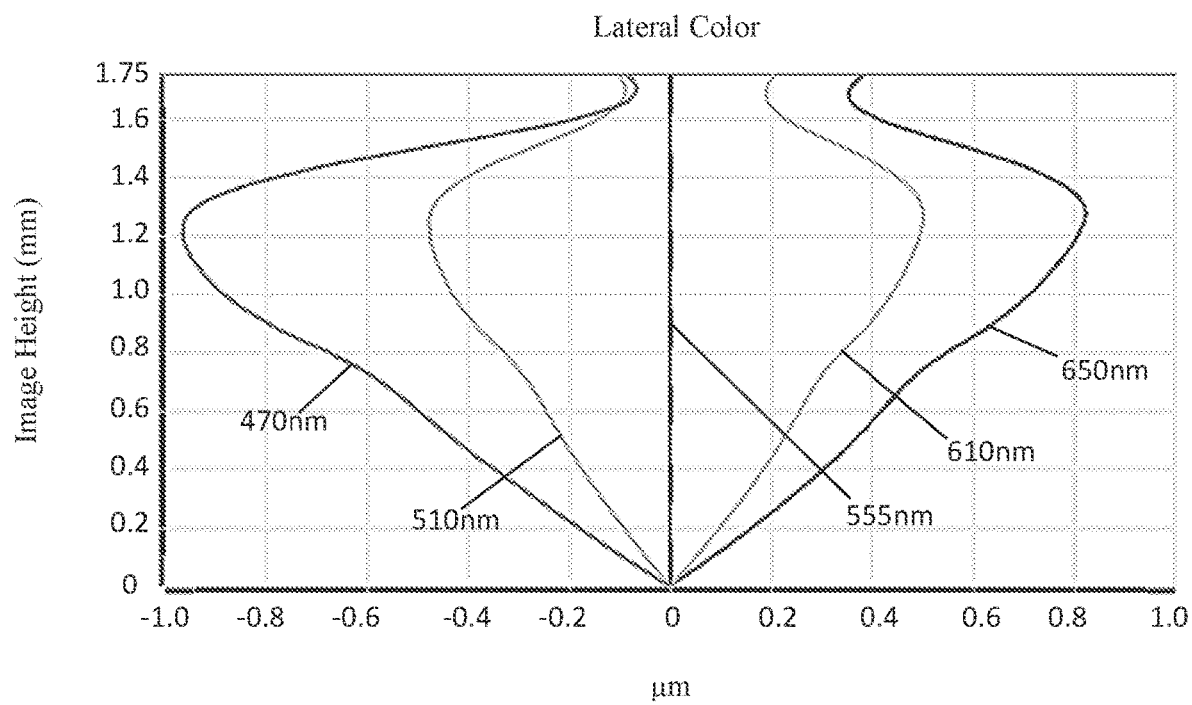
FIG. 19 is a schematic diagram of a lateral color of the camera optical lens shown in FIG. 17.
Figure 20:
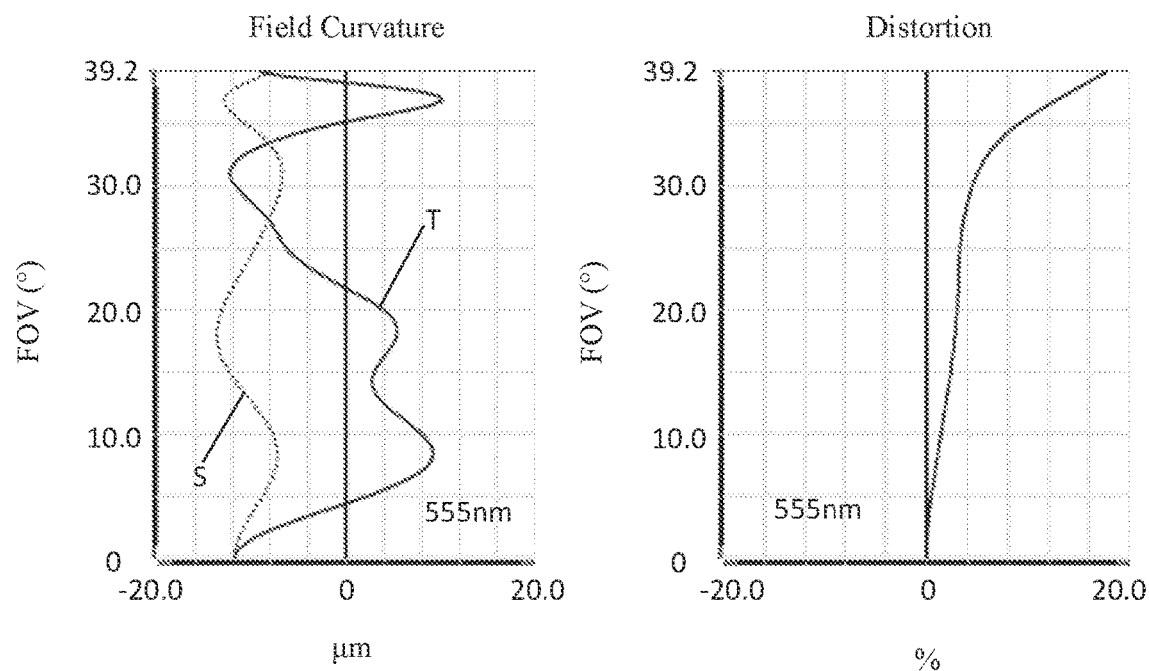
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 650 nm, 610 nm, 555 nm, 510 nm, and 470 nm after passing the camera optical lens 50 according to Embodiment 5. FIG. 20 illustrates a field curvature and a distortion of light with a wavelength of 555 nm after passing the camera optical lens 50 according to Embodiment 5.

Table 37 below further lists values corresponding to various conditions in the present embodiment according to the above conditions. It can be seen that the camera optical lens according to this embodiment satisfies the above conditions.

In this embodiment, the entrance pupil diameter ENPD of the camera optical lens is 0.738 mm. The full field of view image height IH is 1.750 mm. The field of view (FOV) is 78.40°. Thus, the camera optical lens 50 can achieve ultra-

TABLE 18

| | Cone coefficient | Aspherical coefficient | | | | |
|---|---|---|---|---|---|---|
| | k | A4 | A6 | A8 | A10 | A12 |
| R1 | 2.4341E-02  | -3.0300E-01 | -1.2291E-01 | -1.5410E+01 | -1.7898E+02 | 7.5341E+03 |
| R2 | 4.4637E+01  | -7.7321E-01 | -1.3284E+01 | 3.2249E+02  | -5.5719E+03 | 6.0848E+04 |
| R3 | 4.6652E-01  | -1.8986E+00 | -3.9518E+01 | 1.4506E+03  | -2.4204E+04 | 2.5733E+05 |
| R4 | -4.7862E+00 | -3.3279E+00 | -3.9897E+00 | 4.0355E+02  | -5.0006E+03 | 3.5851E+04 |
| R5 | -8.9399E+00 | -1.4508E-01 | -4.3986E+00 | 2.6669E+01  | -8.6380E+01 | 1.7683E+02 |
| R6 | -4.3118E-01 | 8.5454E-02  | -2.2368E+00 | 5.8520E+00  | -8.6285E+00 | 7.9180E+00 |

| | Cone coefficient | Aspherical coefficient | | | |
|---|---|---|---|---|---|
| | k | A14 | A16 | A18 | A20 |
| R1 | 2.4341E-02  | -1.0218E+05 | 6.9448E+05 | -2.4292E+06 | 3.4561E+06 |
| R2 | 4.4637E+01  | -4.1700E+05 | 1.7448E+06 | -4.0799E+06 | 4.0806E+06 |
| R3 | 4.6652E-01  | -1.6877E+06 | 6.5879E+06 | -1.4071E+07 | 1.2697E+07 |
| R4 | -4.7862E+00 | -1.5297E+05 | 3.7998E+05 | -5.0711E+05 | 2.8006E+05 |
| R5 | -8.9399E+00 | -2.3185E+02 | 1.8764E+02 | -8.5083E+01 | 1.6496E+01 |
| R6 | -4.3118E-01 | -4.5611E+00 | 1.5960E+00 | -3.0902E-01 | 2.5293E-02 | thinness and a wide angle while having on-axis and off-axis aberrations sufficiently corrected, thereby leading to better optical characteristics.

Embodiment 6

Figure 21:
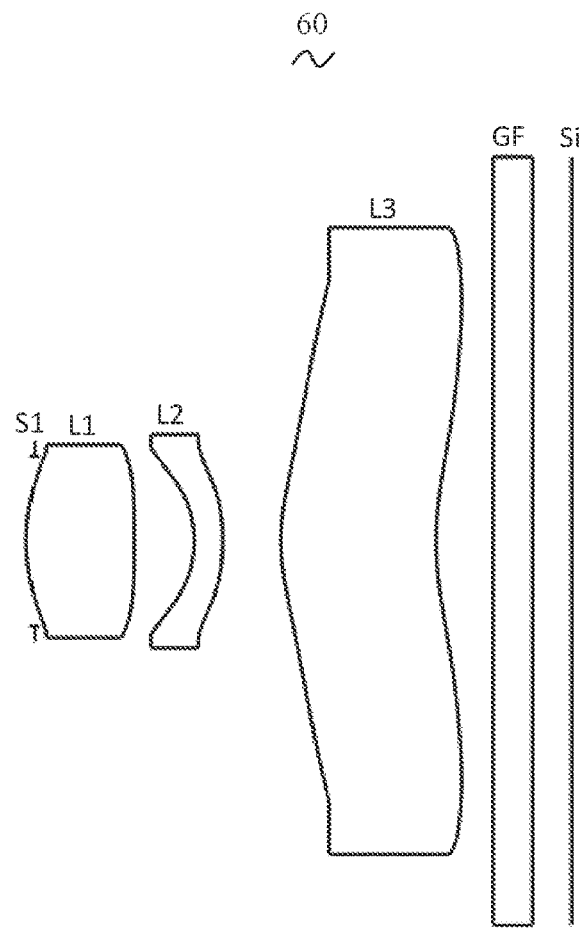
FIG. 21 is a schematic structural diagram of a camera optical lens according to Embodiment 6 of the present invention.

Embodiment 6 is basically the same as Embodiment 1 and involves symbols having the same meanings as Embodiment 1, and only differences from Embodiment 1 will be described in the following. FIG. 21 shows a camera optical lens 60 according to Embodiment 6 of the present invention.

Table 21 and Table 22 show design data of the camera optical lens 60 in Embodiment 6 of the present invention.

TABLE 21

|  | R | d | nd |  | vd |
|---|---|---|---|---|---|
| S1 | ∞ | d0 = −0.042 | | | |
| R1 | 1.029 | d1 = 0.569 | nd1 | 1.5397 | v1 55.85 |
| R2 | −13.850 | d2 = 0.318 | | | |
| R3 | −0.606 | d3 = 0.150 | nd2 | 1.6860 | v2 31.05 |
| R4 | −1.252 | d4 = 0.308 | | | |
| R5 | 0.997 | d5 = 0.818 | nd3 | 1.6634 | v3 53.17 |
| R6 | 1.605 | d6 = 0.300 | | | |
| R7 | ∞ | d7 = 0.210 | ndg | 1.5168 | vg 64.17 |
| R8 | ∞ | d8 = 0.206 | | | |

Table 22 shows aspherical surface data of respective lenses in the camera optical lens 60 according to Embodiment 6 of the present invention.

TABLE 22

| | Cone coefficient | Aspherical coefficient | | | | |
|---|---|---|---|---|---|---|
| | k | A4 | A6 | A8 | A10 | A12 |
| R1 | 5.8043E−01 | 1.8396E−01 | −1.7481E+01 | 4.8475E+02 | −8.1761E+03 | 8.5502E+04 |
| R2 | 8.7483E+01 | −7.3970E−01 | 1.7548E+00 | −5.1417E+01 | 5.1310E+02 | −2.6722E+03 |
| R3 | 7.8665E−02 | −1.8913E+00 | −3.0111E+01 | 1.1063E+03 | −1.6517E+04 | 1.5370E+05 |
| R4 | 1.4949E+00 | −1.9798E+00 | −2.1215E+01 | 6.7773E+02 | −7.9997E+03 | 5.6382E+04 |
| R5 | −9.7389E+00 | −2.2267E−01 | −9.3801E−02 | 1.6564E+00 | −3.9078E+00 | 4.8465E+00 |
| R6 | −1.6515E+00 | −2.7938E−01 | −1.0503E−01 | 7.8603E−01 | −1.2014E+00 | 1.0283E+00 |

| | Cone coefficient | Aspherical coefficient | | | |
|---|---|---|---|---|---|
| | k | A14 | A16 | A18 | A20 |
| R1 | 5.8043E−01 | −5.6129E+05 | 2.2485E+06 | −5.0211E+06 | 4.7855E+06 |
| R2 | 8.7483E+01 | 4.8903E+03 | 1.7066E+04 | −9.7073E+04 | 1.3185E+05 |
| R3 | 7.8665E−02 | −8.9186E+05 | 3.1269E+06 | −6.0761E+06 | 5.0381E+06 |
| R4 | 1.4949E+00 | −2.4502E+05 | 6.4370E+05 | −9.4049E+05 | 5.8812E+05 |
| R5 | −9.7389E+00 | −3.6015E+00 | 1.6105E+00 | −4.0003E−01 | 4.2398E−02 |
| R6 | −1.6515E+00 | −5.4849E−01 | 1.7992E−01 | −3.3060E−02 | 2.5911E−03 |

Table 23 and Table 24 show design data of inflection points and stagnation points of respective lenses in the camera optical lens 60 according to Embodiment 6 of the present invention.

TABLE 23

| | Number of inflection points | Inflection point position 1 | Inflection point position 2 | Inflection point position 3 |
|---|---|---|---|---|
| P1R1 | 1 | 0.445 | / | / |
| P1R2 | 0 | / | / | / |
| P2R1 | 1 | 0.395 | / | / |
| P2R2 | 1 | 0.375 | / | / |
| P3R1 | 3 | 0.395 | 0.815 | 1.265 |
| P3R2 | 1 | 0.455 | / | / |

TABLE 24

| | Number of stagnation points | Stagnation point position 1 |
|---|---|---|
| P1R1 | 0 | / |
| P1R2 | 0 | / |
| P2R1 | 0 | / |
| P2R2 | 1 | 0.535 |
| P3R1 | 0 | / |
| P3R2 | 1 | 1.245 |

Figure 22:
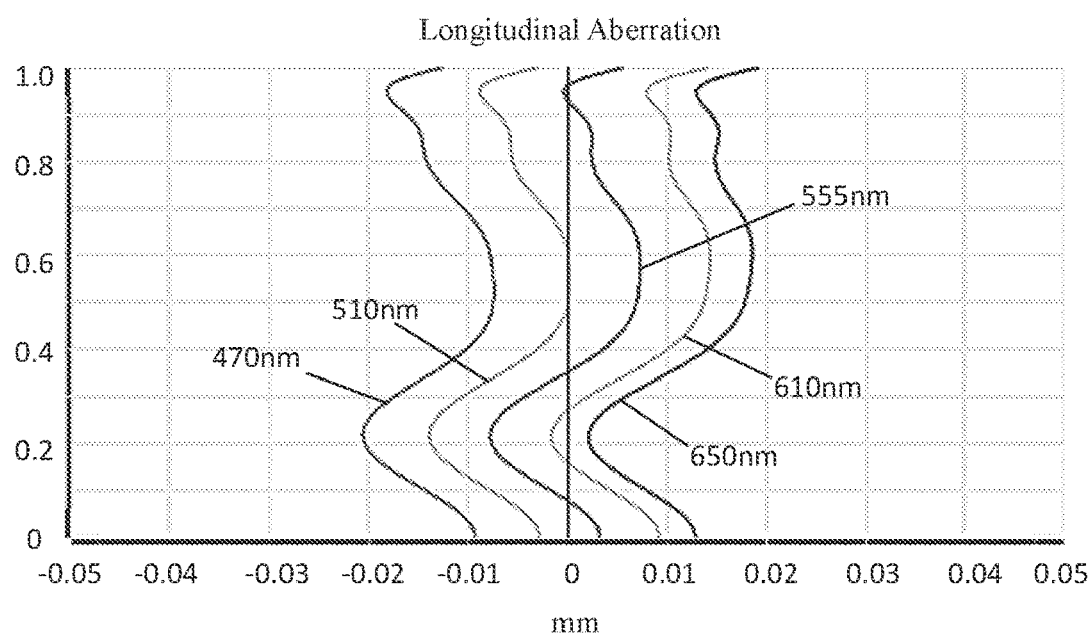
FIG. 22 is a schematic diagram of a longitudinal aberration of the camera optical lens shown in FIG. 21.
Figure 23:
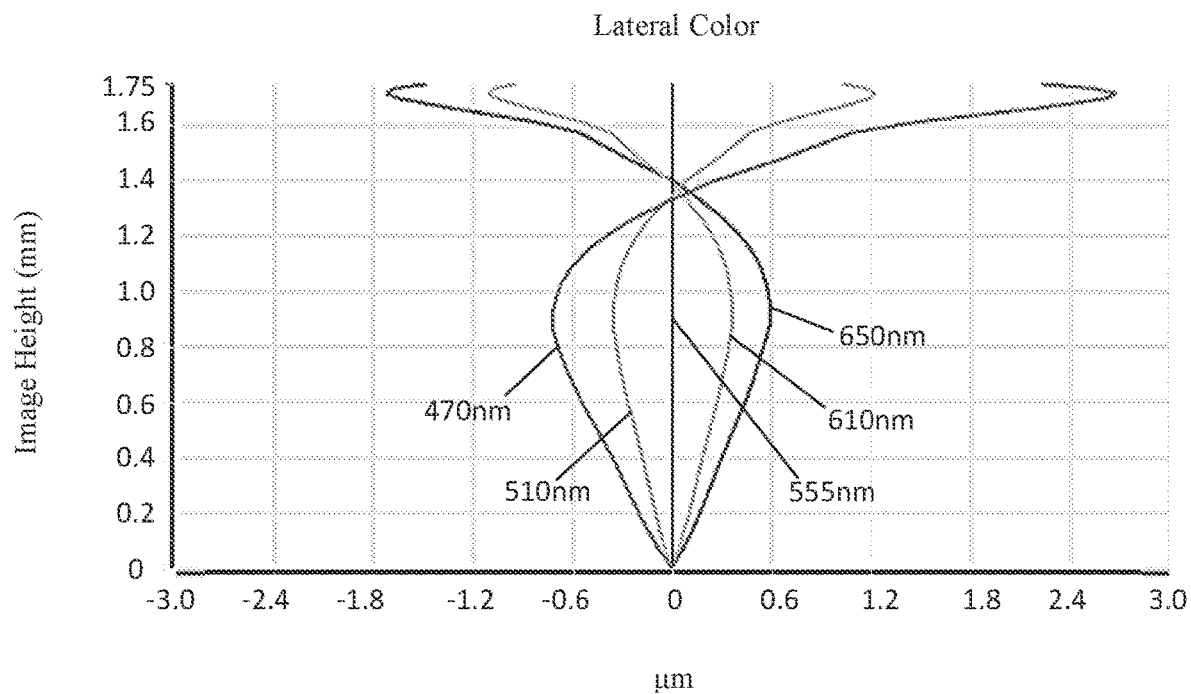
FIG. 23 is a schematic diagram of a lateral color of the camera optical lens shown in FIG. 21.
Figure 24:
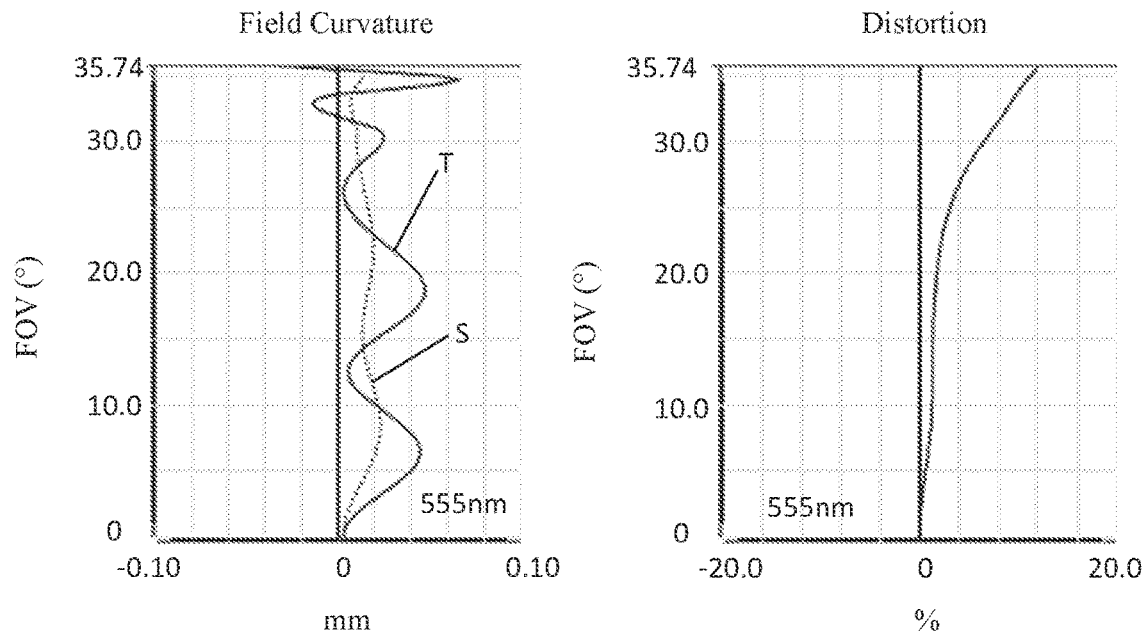
FIG. 24 is a schematic diagram of a field curvature and a distortion of the camera optical lens shown in FIG. 21.

FIG. 22 and FIG. 23 illustrate a longitudinal aberration and a lateral color of light with wavelengths of 650 nm, 610 nm, 555 nm, 510 nm, and 470 nm after passing the camera optical lens 60 according to Embodiment 6. FIG. 24 illustrates a field curvature and a distortion of light with a wavelength of 555 nm after passing the camera optical lens 60 according to Embodiment 6.

Table 37 below further lists values corresponding to various conditions in the present embodiment according to the above conditions. It can be seen that the camera optical lens according to this embodiment satisfies the above conditions.

In this embodiment, the entrance pupil diameter ENPD of the camera optical lens is 0.885 mm. The full field of view image height IH is 1.750 mm. The field of view (FOV) is 71.48°. Thus, the camera optical lens 60 can achieve ultra-thinness and a wide angle while having on-axis and off-axis aberrations sufficiently corrected, thereby leading to better optical characteristics.

Embodiment 7

Figure 25:
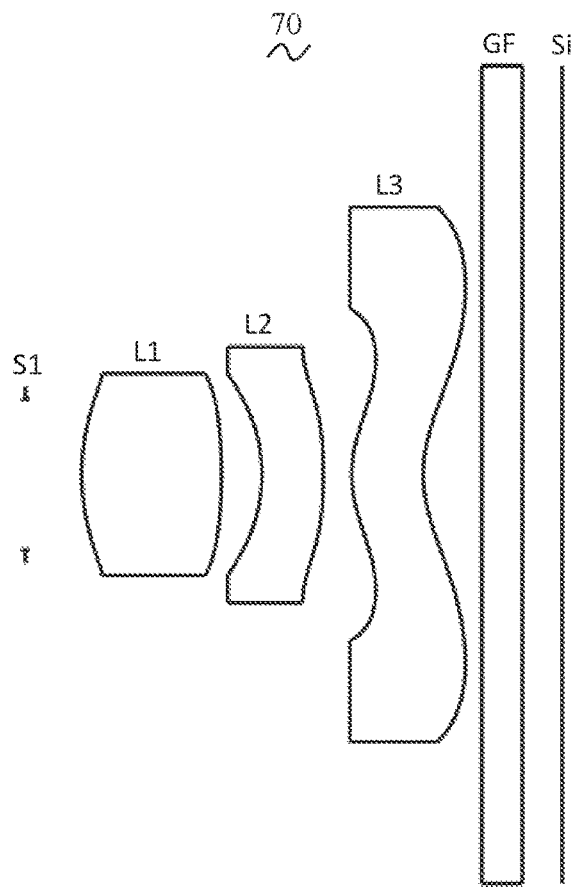
FIG. 25 is a schematic structural diagram of a camera optical lens according to Embodiment 7 of the present invention.

Embodiment 7 is basically the same as Embodiment 1 and involves symbols having the same meanings as Embodiment 1, and only differences from Embodiment 1 will be described in the following. FIG. 25 shows a camera optical lens 70 according to Embodiment 7 of the present invention.

Table 25 and Table 26 show design data of the camera optical lens 70 in Embodiment 7 of the present invention.

TABLE 25

|  | R | d | nd |  | vd |
|---|---|---|---|---|---|
| S1 | ∞ | d0 = 0.291 | | | |
| R1 | 1.054 | d1 = 0.719 | nd1 | 1.5444 | v1 55.82 |
| R2 | −2.618 | d2 = 0.207 | | | |

TABLE 25-continued

| | R | d | | nd | | vd |
|---|---|---|---|---|---|---|
| R3 | −0.751 | d3 = 0.312 | nd2 | 1.6449 | v2 | 22.54 |
| R4 | −3.639 | d4 = 0.147 | | | | |
| R5 | 0.498 | d5 = 0.369 | nd3 | 1.5444 | v3 | 55.82 |
| R6 | 0.640 | d6 = 0.300 | | | | |
| R7 | ∞ | d7 = 0.210 | ndg | 1.5168 | vg | 64.17 |
| R8 | ∞ | d8 = 0.205 | | | | |

Table 26 shows aspherical surface data of respective lenses in the camera optical lens 70 according to Embodiment 7 of the present invention.

TABLE 26

| | Cone coefficient | Aspherical coefficient | | | | |
|---|---|---|---|---|---|---|
| | k | A4 | A6 | A8 | A10 | A12 |
| R1 | 1.6492E−03 | −7.2865E−02 | −1.0388E+00 | 2.3108E+01 | −3.2246E+02 | 2.2955E+03 |
| R2 | 1.0520E+01 | −2.6278E−01 | 2.5394E−01 | −6.4896E+01 | 1.0850E+03 | −9.7168E+03 |
| R3 | −7.0612E−02 | 1.2435E−01 | −2.9227E+00 | 7.4115E+01 | 2.1787E+02 | −2.1975E+03 |
| R4 | 8.6105E−01 | −3.2608E+00 | 2.7396E+01 | −1.9670E+02 | 1.1164E+03 | −4.3927E+03 |
| R5 | −5.3717E+00 | 1.9916E−02 | −4.0185E+00 | 8.1233E+00 | 1.7151E+01 | −1.5591E+02 |
| R6 | −1.5681E+00 | −7.1261E−01 | −7.2927E−01 | 4.7470E+00 | −9.1942E+00 | 1.0099E+01 |

| | Cone coefficient | Aspherical coefficient | | | |
|---|---|---|---|---|---|
| | k | A14 | A16 | A18 | A20 |
| R1 | 1.6492E−03 | −7.0914E+03 | −5.7547E+03 | 8.9650E+04 | −1.5710E+05 |
| R2 | 1.0520E+01 | 5.2514E+04 | −1.7217E+05 | 3.1565E+05 | −2.4838E+05 |
| R3 | −7.0612E−02 | 1.1733E+04 | −4.1050E+04 | 8.4503E+04 | −7.4911E+04 |
| R4 | 8.6105E−01 | 1.1675E+04 | −2.0034E+04 | 1.9966E+04 | −8.7339E+03 |
| R5 | −5.3717E+00 | 4.8648E+02 | −8.4505E+02 | 7.9277E+02 | −3.1269E+02 |
| R6 | −1.5681E+00 | −6.8943E+00 | 2.9035E+00 | −6.9374E−01 | 7.2092E−02 |

Table 27 and Table 28 show design data of inflection points and stagnation points of respective lenses in the camera optical lens 70 according to Embodiment 7 of the present invention.

TABLE 27

| | Number of inflection points | Inflection point position 1 |
|---|---|---|
| P1R1 | 1 | 0.455 |
| P1R2 | 0 | / |
| P2R1 | 0 | / |
| P2R2 | 1 | 0.435 |
| P3R1 | 1 | 0.295 |
| P3R2 | 1 | 0.385 |

TABLE 28

| | Number of stagnation points | Stagnation point position 1 |
|---|---|---|
| P1R1 | 0 | / |
| P1R2 | 0 | / |
| P2R1 | 0 | / |
| P2R2 | 1 | 0.605 |
| P3R1 | 1 | 0.565 |
| P3R2 | 1 | 0.915 |

Figure 26:
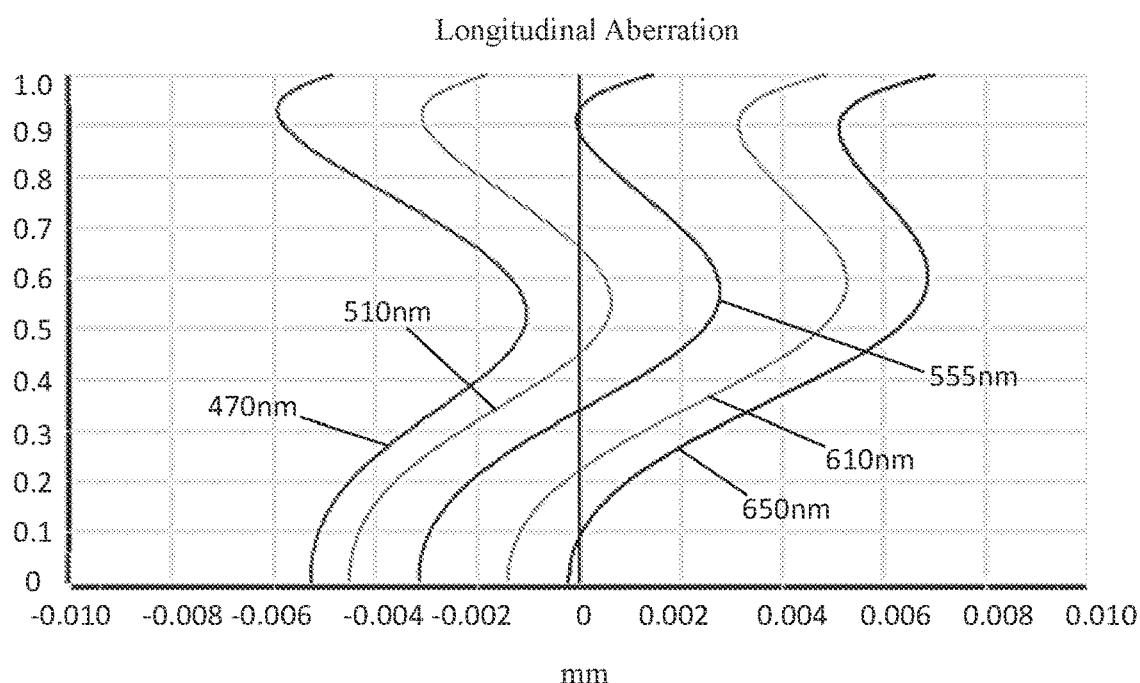
FIG. 26 is a schematic diagram of a longitudinal aberration of the camera optical lens shown in FIG. 25.
Figure 27:
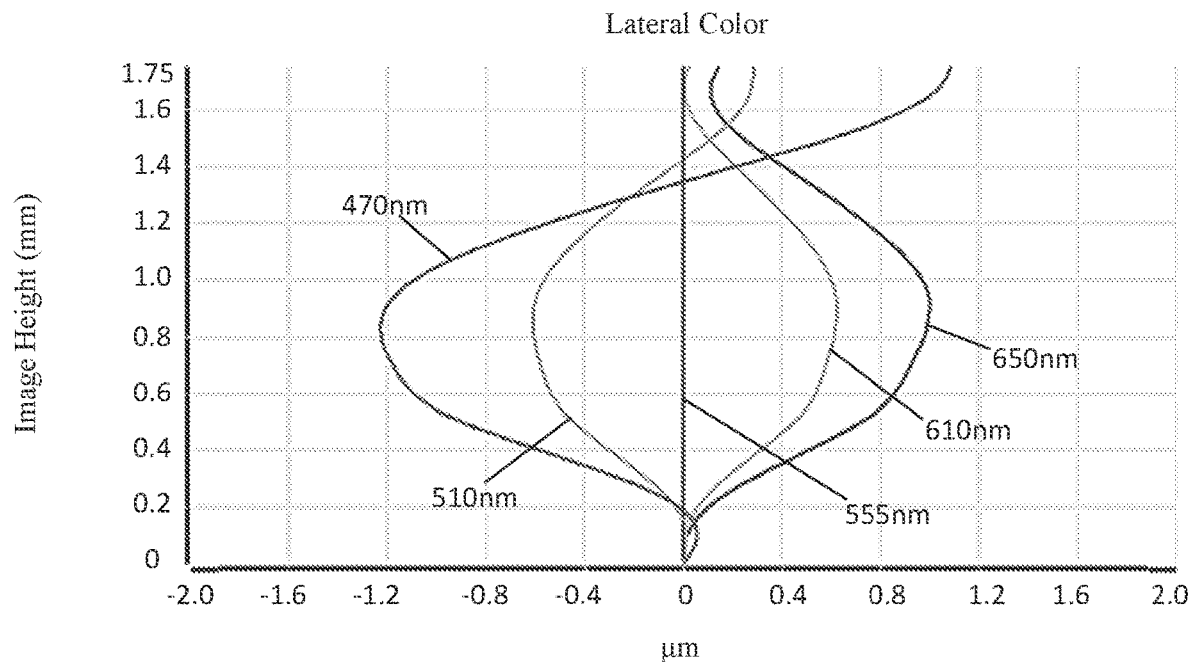
FIG. 27 is a schematic diagram of a lateral color of the camera optical lens shown in FIG. 25.
Figure 28:
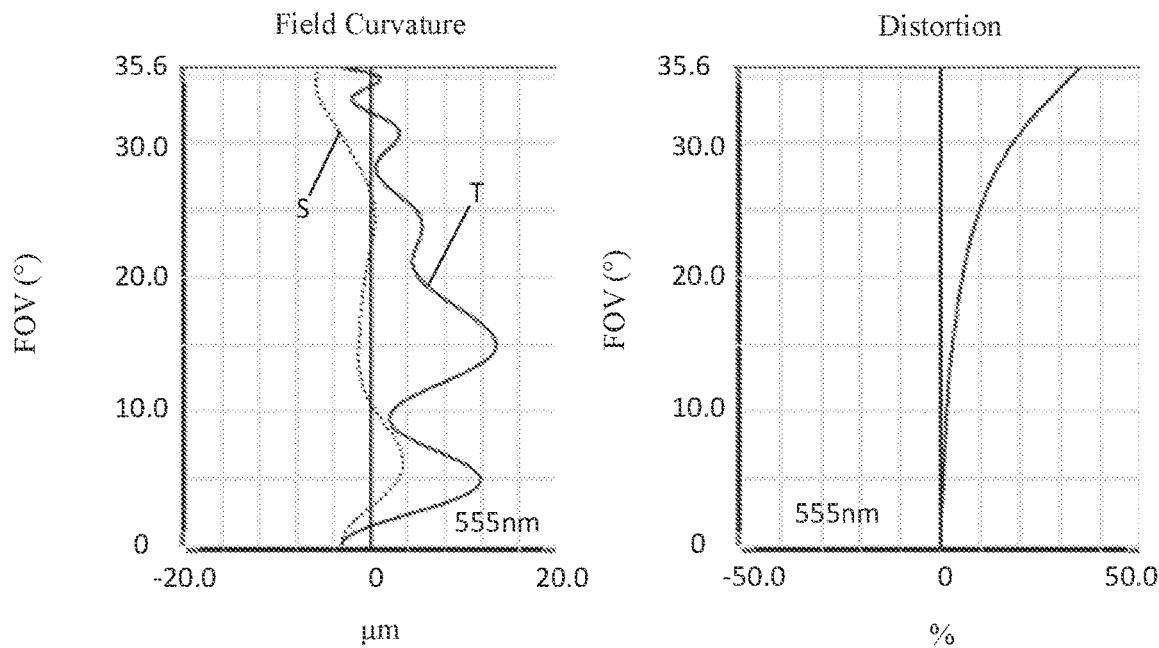
FIG. 28 is a schematic diagram of a field curvature and a distortion of the camera optical lens shown in FIG. 25.

FIG. 26 and FIG. 27 illustrate a longitudinal aberration and a lateral color of light with wavelengths of 650 nm, 610 nm, 555 nm, 510 nm, and 470 nm after passing the camera optical lens 70 according to Embodiment 7. FIG. 28 illustrates a field curvature and a distortion of light with a wavelength of 555 nm after passing the camera optical lens 70 according to Embodiment 7.

Table 37 below further lists values corresponding to various conditions in the present embodiment according to the above conditions. It can be seen that the camera optical lens according to this embodiment satisfies the above conditions.

In this embodiment, the entrance pupil diameter ENPD of the camera optical lens is 0.736 mm. The full field of view image height IH is 1.750 mm. The field of view (FOV) is 71.20°. Thus, the camera optical lens 70 can achieve ultra-thinness and a wide angle while having on-axis and off-axis aberrations sufficiently corrected, thereby leading to better optical characteristics.

Embodiment 8

Figure 29:
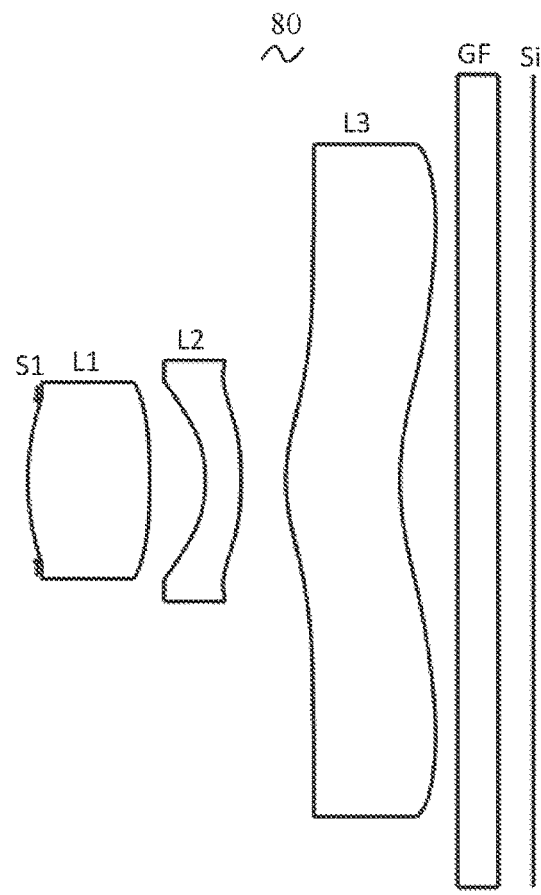
FIG. 29 is a schematic structural diagram of a camera optical lens according to Embodiment 8 of the present invention.

Embodiment 8 is basically the same as Embodiment 1 and involves symbols having the same meanings as Embodiment 1, and only differences from Embodiment 1 will be described in the following. FIG. 29 shows a camera optical lens 80 according to Embodiment 8 of the present invention.

Table 29 and Table 30 show design data of the camera optical lens 80 in Embodiment 8 of the present invention.

TABLE 29

| | R | d | | nd | | vd |
|---|---|---|---|---|---|---|
| S1 | ∞ | d0 = −0.050 | | | | |
| R1 | 1.097 | d1 = 0.632 | nd1 | 1.5405 | v1 | 55.85 |
| R2 | −3.420 | d2 = 0.288 | | | | |
| R3 | −0.661 | d3 = 0.184 | nd2 | 1.5603 | v2 | 44.86 |
| R4 | −2.457 | d4 = 0.233 | | | | |
| R5 | 0.778 | d5 = 0.586 | nd3 | 1.6134 | v3 | 55.86 |
| R6 | 1.224 | d6 = 0.300 | | | | |
| R7 | ∞ | d7 = 0.210 | ndg | 1.5168 | vg | 64.17 |
| R8 | ∞ | d8 = 0.181 | | | | |

Table 30 shows aspherical surface data of respective lenses in the camera optical lens 80 according to Embodiment 8 of the present invention.

TABLE 30

| | Cone coefficient | Aspherical coefficient | | | | |
|---|---|---|---|---|---|---|
| | k | A4 | A6 | A8 | A10 | A12 |
| R1 | 4.6995E−01 | −1.8816E−01 | 6.4441E−01 | −4.2098E+01 | 9.7533E+02 | −1.4155E+04 |
| R2 | −2.1931E+01 | −6.6373E−01 | −6.3987E+00 | 1.3667E+02 | −1.9286E+03 | 1.7193E+04 |
| R3 | 2.4486E−01 | −3.0568E+00 | 3.4422E+01 | −3.0149E+02 | 1.9846E+03 | −2.6038E+03 |
| R4 | 5.8746E+00 | −4.3456E+00 | 3.7355E+01 | −2.4896E+02 | 1.3390E+03 | −4.3658E+03 |
| R5 | −8.7446E+00 | −2.0035E−01 | −5.8822E−01 | 2.3349E+00 | −3.3212E+00 | 2.0621E+00 |
| R6 | −5.2082E−01 | −3.9666E−01 | −4.8802E−02 | 5.1212E−01 | −5.9032E−01 | 3.3093E−01 |

| | Cone coefficient | Aspherical coefficient | | | |
|---|---|---|---|---|---|
| | k | A14 | A16 | A18 | A20 |
| R1 | 4.6995E−01 | 1.2842E+05 | −7.1133E+05 | 2.1978E+06 | −2.9041E+06 |
| R2 | −2.1931E+01 | −9.6301E+04 | 3.2862E+05 | −6.2504E+05 | 5.0758E+05 |
| R3 | 2.4486E−01 | −4.5699E+04 | 2.8843E+05 | −6.9726E+05 | 6.3106E+05 |
| R4 | 5.8746E+00 | 7.7474E+03 | −6.0372E+03 | −3.4781E+02 | 2.1935E+03 |
| R5 | −8.7446E+00 | −6.2455E−02 | −6.3280E−01 | 3.2388E−01 | −5.2529E−02 |
| R6 | −5.2082E−01 | −9.5561E−02 | 9.7262E−03 | 1.4177E−03 | −3.2532E−04 |

Table 31 and Table 32 show design data of inflection points and stagnation points of respective lenses in the camera optical lens 80 according to Embodiment 8 of the present invention.

TABLE 31

| | Number of inflection points | Inflection point position 1 | Inflection point position 2 | Inflection point position 3 |
|---|---|---|---|---|
| P1R1 | 0 | / | / | / |
| P1R2 | 0 | / | / | / |
| P2R1 | 0 | / | / | / |
| P2R2 | 1 | 0.365 | / | / |
| P3R1 | 3 | 0.335 | 1.025 | 1.235 |
| P3R2 | 1 | 0.475 | / | / |

TABLE 32

| | Number of stagnation points | Stagnation point position 1 |
|---|---|---|
| P1R1 | 0 | / |
| P1R2 | 0 | / |
| P2R1 | 0 | / |
| P2R2 | 1 | 0.515 |
| P3R1 | 1 | 1.285 |
| P3R2 | 1 | 1.255 |

Figure 30:
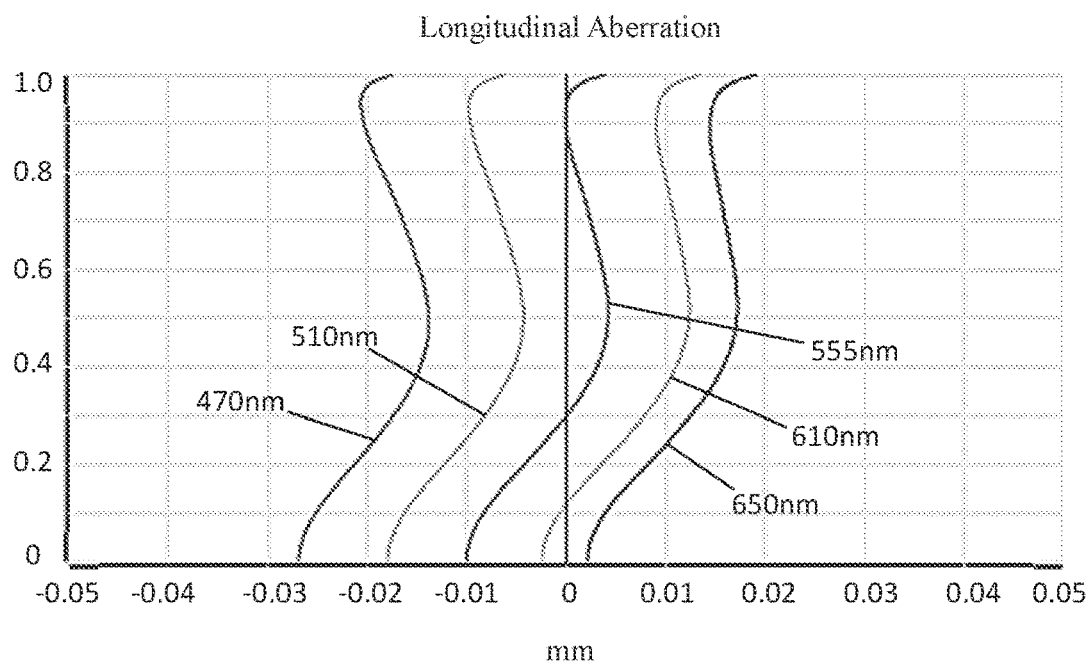
FIG. 30 is a schematic diagram of a longitudinal aberration of the camera optical lens shown in FIG. 29.
Figure 31:
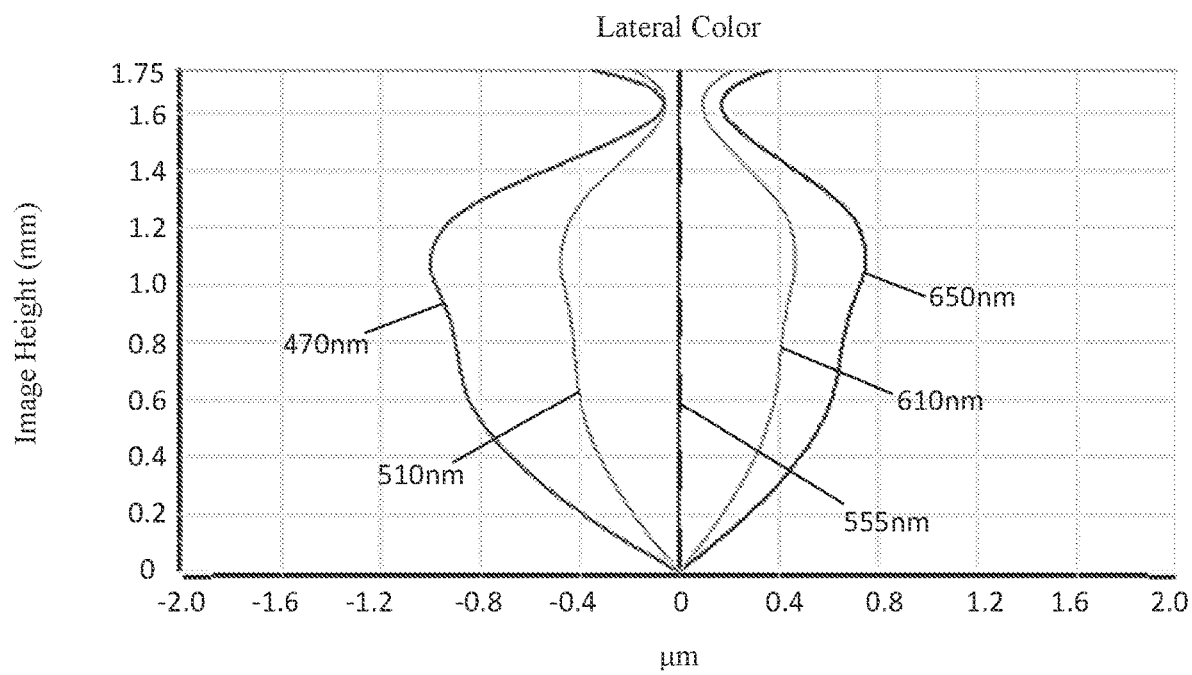
FIG. 31 is a schematic diagram of a lateral color of the camera optical lens shown in FIG. 29.
Figure 32:
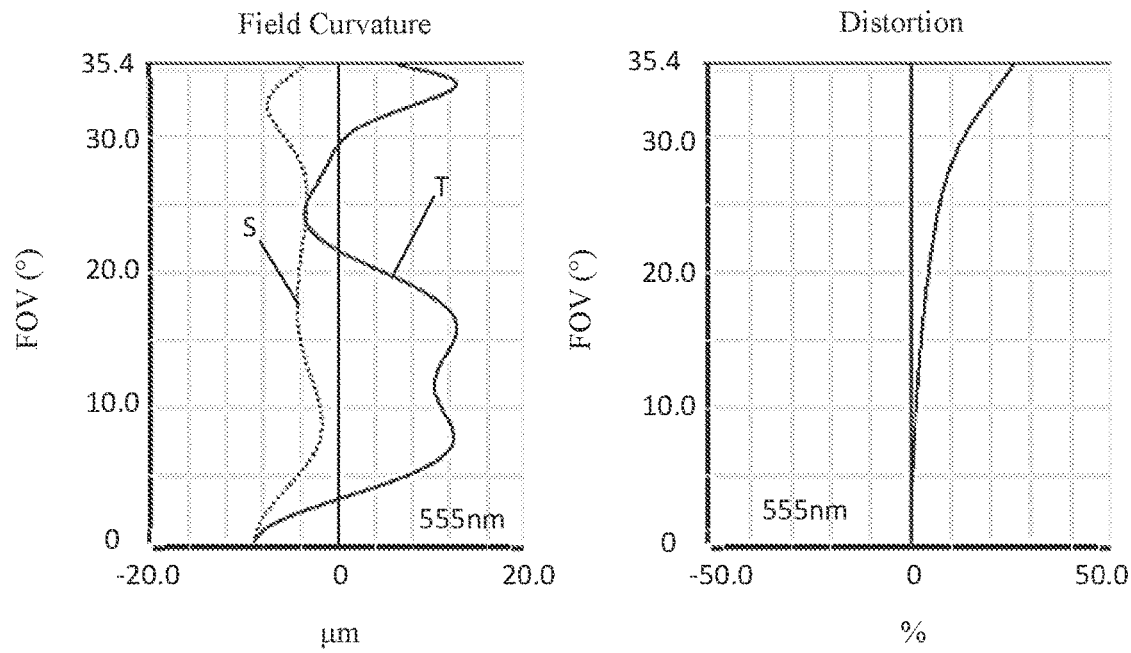
FIG. 32 is a schematic diagram of a field curvature and a distortion of the camera optical lens shown in FIG. 29.

FIG. 30 and FIG. 31 illustrate a longitudinal aberration and a lateral color of light with wavelengths of 650 nm, 610 nm, 555 nm, 510 nm, and 470 nm after passing the camera optical lens 80 according to Embodiment 8. FIG. 32 illustrates a field curvature and a distortion of light with a wavelength of 555 nm after passing the camera optical lens 80 according to Embodiment 8.

Table 37 below further lists values corresponding to various conditions in the present embodiment according to the above conditions. It can be seen that the camera optical lens according to this embodiment satisfies the above conditions.

In this embodiment, the entrance pupil diameter ENPD of the camera optical lens is 0.795 mm. The full field of view image height IH is 1.750 mm. The field of view (FOV) is 70.80°. Thus, the camera optical lens 80 can achieve ultra-thinness and a wide angle while having on-axis and off-axis aberrations sufficiently corrected, thereby leading to better optical characteristics.

Embodiment 9

Figure 33:
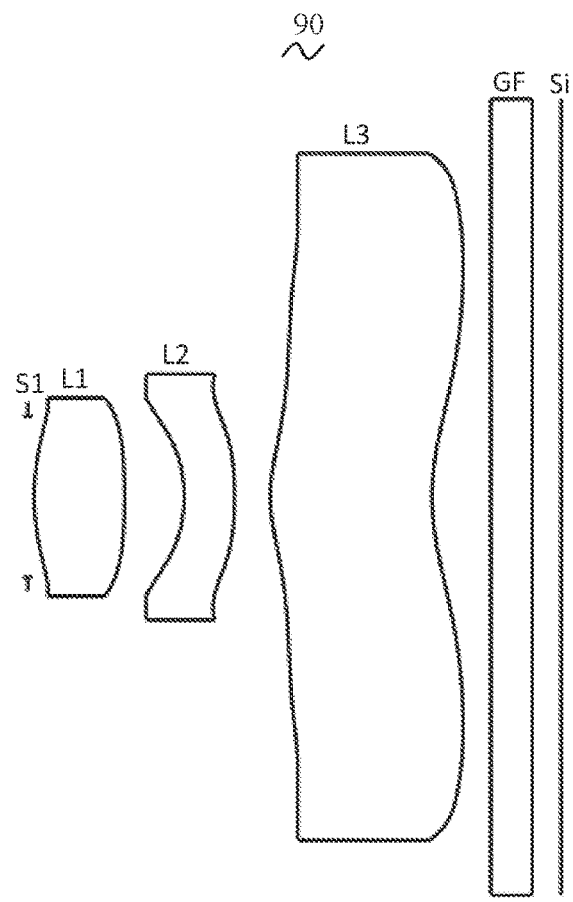
FIG. 33 is a schematic structural diagram of a camera optical lens according to Embodiment 9 of the present invention.

Embodiment 9 is basically the same as Embodiment 1 and involves symbols having the same meanings as Embodiment 1, and only differences from Embodiment 1 will be described in the following. FIG. 33 shows a camera optical lens 90 according to Embodiment 9 of the present invention.

Table 33 and Table 34 show design data of the camera optical lens 90 in Embodiment 9 of the present invention.

TABLE 33

| | R | d | nd | | vd | |
|---|---|---|---|---|---|---|
| S1 | ∞ | d0 = 0.032 | | | | |
| R1 | 1.142 | d1 = 0.462 | nd1 | 1.5444 | v1 | 55.82 |
| R2 | −3.277 | d2 = 0.304 | | | | |
| R3 | −0.722 | d3 = 0.257 | nd2 | 1.6449 | v2 | 22.54 |
| R4 | −2.515 | d4 = 0.184 | | | | |
| R5 | 0.769 | d5 = 0.822 | nd3 | 1.5444 | v3 | 55.82 |
| R6 | 1.195 | d6 = 0.300 | | | | |
| R7 | ∞ | d7 = 0.210 | ndg | 1.5168 | vg | 64.17 |
| R8 | ∞ | d8 = 0.149 | | | | |

Table 34 shows aspherical surface data of respective lenses in the camera optical lens 90 according to Embodiment 9 of the present invention.

TABLE 34

| | Cone coefficient | Aspherical coefficient | | | | |
|---|---|---|---|---|---|---|
| | k | A4 | A6 | A8 | A10 | A12 |
| R1 | −3.1035E−03 | −1.9625E−01 | −1.6911E+00 | 3.1075E+01 | −6.4128E+02 | 7.7405E+03 |
| R2 | 1.2177E+01 | −7.3386E−01 | −6.3273E−01 | 6.1439E+00 | −1.9727E+02 | 2.4209E+03 |
| R3 | 3.1473E−01 | −2.0873E+00 | 2.2366E+01 | −2.0744E+02 | 1.5417E+03 | −5.2233E+03 |
| R4 | 7.9415E+00 | −3.6511E+00 | 2.7135E+01 | −1.6139E+02 | 8.0562E+02 | −2.7955E+03 |

TABLE 34-continued

| | | | | | |
|---|---|---|---|---|---|
| R5 | −9.1341E+00 | −7.6838E−01 | 1.4834E+00 | −1.6973E+00 | 1.6964E+00 | −1.9810E+00 |
| R6 | −1.0371E+00 | −4.4861E−01 | 1.1245E−01 | 4.5393E−01 | −8.4913E−01 | 7.8323E−01 |

| | Cone coefficient | Aspherical coefficient | | | |
|---|---|---|---|---|---|
| | k | A14 | A16 | A18 | A20 |
| R1 | −3.1035E−03 | −5.8438E+04 | 2.6480E+05 | −6.6051E+05 | 6.8673E+05 |
| R2 | 1.2177E+01 | −1.6585E+04 | 6.6328E+04 | −1.4550E+05 | 1.3409E+05 |
| R3 | 3.1473E−01 | 6.3392E+02 | 4.7028E+04 | −1.2465E+05 | 1.0237E+05 |
| R4 | 7.9415E+00 | 7.0700E+03 | −1.3195E+04 | 1.5928E+04 | −8.8820E+03 |
| R5 | −9.1341E+00 | 2.0021E+00 | −1.2565E+00 | 4.1574E−01 | −5.5562E−02 |
| R6 | −1.0371E+00 | −4.3075E−01 | 1.4116E−01 | −2.5305E−02 | 1.9023E−03 |

Table 35 and Table 36 show design data of inflection points and stagnation points of respective lenses in the camera optical lens 90 according to Embodiment 9 of the present invention.

TABLE 35

| | Number of inflection points | Inflection point position 1 | Inflection point position 2 | Inflection point position 3 | Inflection point position 4 | Inflection point position 5 |
|---|---|---|---|---|---|---|
| P1R1 | 1 | 0.365 | / | / | / | / |
| P1R2 | 0 | / | / | / | / | / |
| P2R1 | 1 | 0.425 | / | / | / | / |
| P2R2 | 1 | 0.405 | / | / | / | / |
| P3R1 | 5 | 0.275 | 0.835 | 1.145 | 1.275 | 1.305 |
| P3R2 | 1 | 0.455 | / | / | / | / |

TABLE 36

| | Number of stagnation points | Stagnation point position 1 |
|---|---|---|
| P1R1 | 0 | / |
| P1R2 | 0 | / |
| P2R1 | 0 | / |
| P2R2 | 1 | 0.555 |
| P3R1 | 0 | / |
| P3R2 | 1 | 1.155 |

Figure 34:
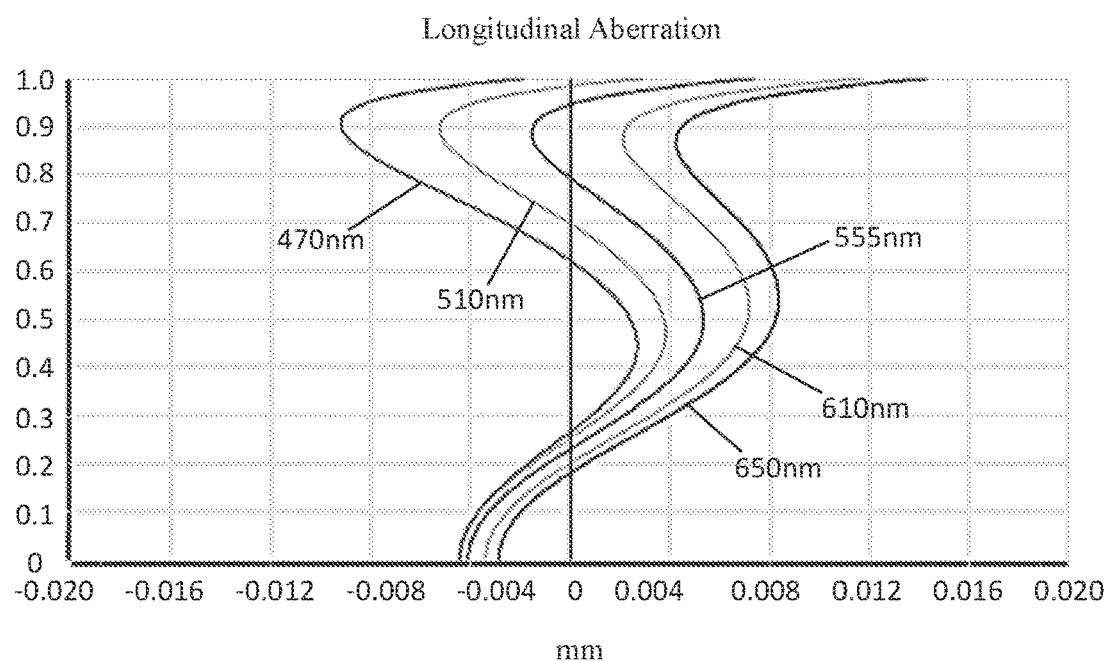
FIG. 34 is a schematic diagram of a longitudinal aberration of the camera optical lens shown in FIG. 33.
Figure 35:
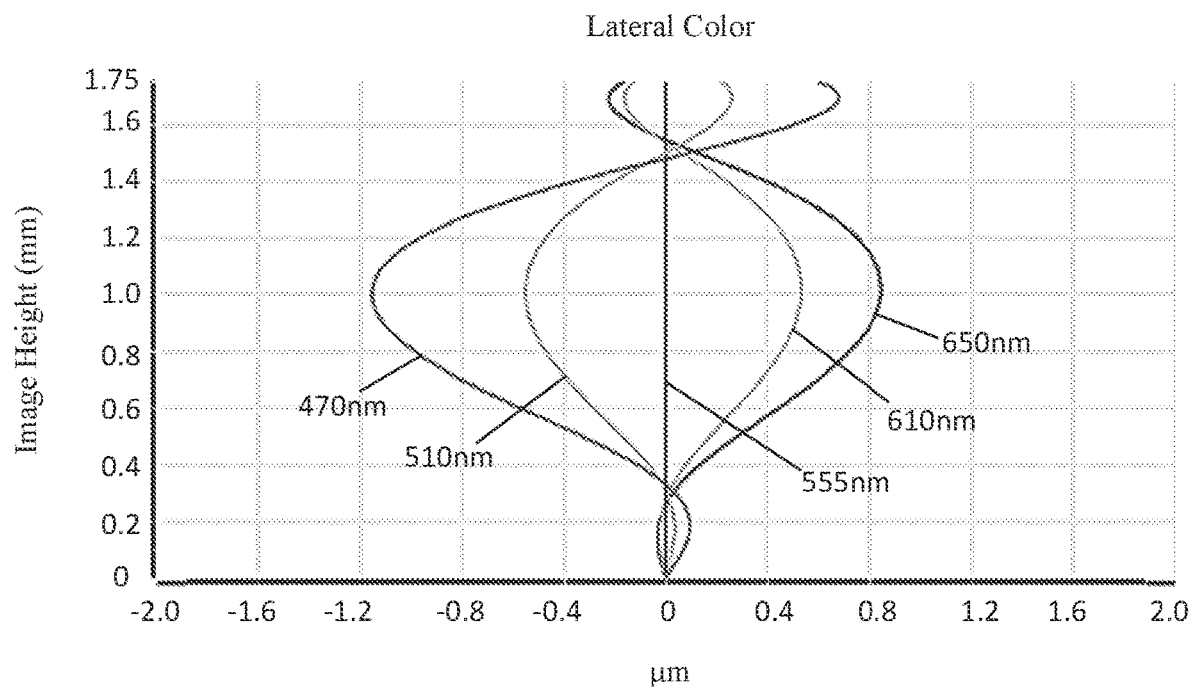
FIG. 35 is a schematic diagram of a lateral color of the camera optical lens shown in FIG. 33.
Figure 36:
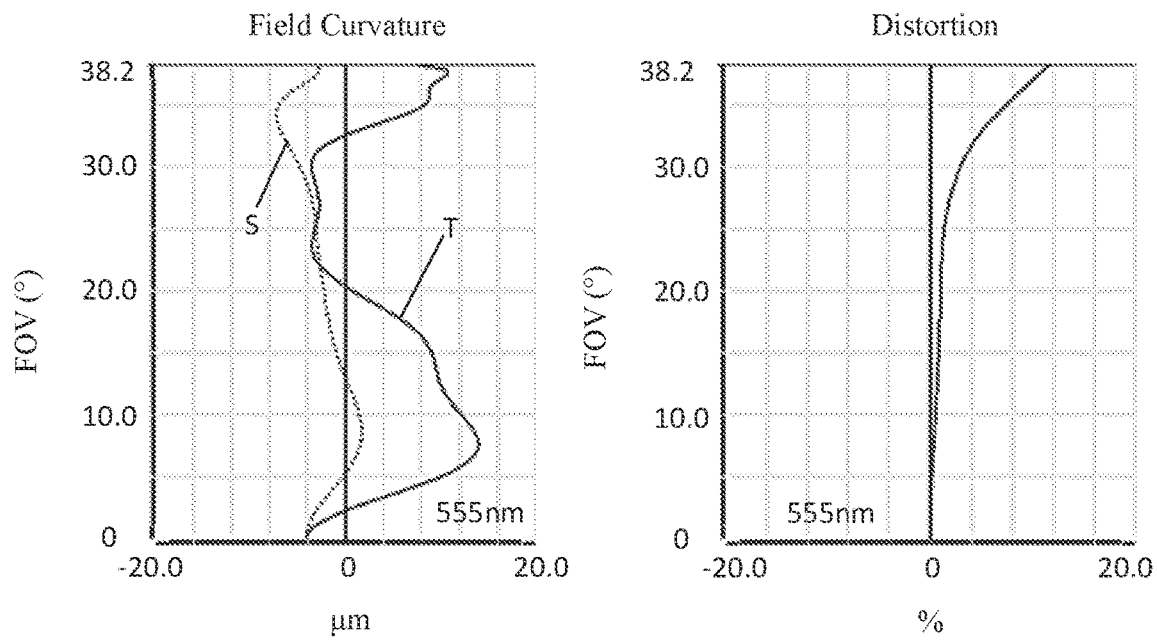
FIG. 36 is a schematic diagram of a field curvature and a distortion of the camera optical lens shown in FIG. 33.

FIG. 34 and FIG. 35 illustrate a longitudinal aberration and a lateral color of light with wavelengths of 650 nm, 610 nm, 555 nm, 510 nm, and 470 nm after passing the camera optical lens 90 according to Embodiment 9. FIG. 36 illustrates a field curvature and a distortion of light with a wavelength of 555 nm after passing the camera optical lens 90 according to Embodiment 9.

Table 37 below further lists values corresponding to various conditions in the present embodiment according to the above conditions. It can be seen that the camera optical lens according to this embodiment satisfies the above conditions.

In this embodiment, the entrance pupil diameter ENPD of the camera optical lens is 0.810 mm. The full field of view image height IH is 1.750 mm. The field of view (FOV) is 76.40°. Thus, the camera optical lens 90 can achieve ultra-thinness and a wide angle while having on-axis and off-axis aberrations sufficiently corrected, thereby leading to better optical characteristics.

TABLE 37

| Parameters and Conditions | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| f1/f | 0.77 | 0.83 | 0.79 | 0.67 | 0.83 | 0.83 | 0.82 | 0.83 | 0.82 |
| f2/f | −0.78 | −0.88 | −0.76 | −0.62 | −0.86 | −0.87 | −0.85 | −0.86 | −0.84 |
| f3/f | 1.15 | 1.19 | 1.01 | 1.19 | 1.15 | 1.19 | 1.19 | 1.19 | 1.19 |
| (R5 + R6)/(R5 − R6) | −3.99 | −5.35 | −2.55 | −4.06 | −3.00 | −4.28 | −7.97 | −4.49 | −4.61 |
| d5/d4 | 3.78 | 2.67 | 3.18 | 3.64 | 3.53 | 2.66 | 2.51 | 2.52 | 4.47 |
| n2 | 1.65 | 1.65 | 1.69 | 1.69 | 1.69 | 1.69 | 1.65 | 1.56 | 1.65 |
| f | 2.162 | 1.892 | 1.692 | 2.125 | 1.800 | 2.160 | 1.796 | 1.941 | 1.976 |
| f1 | 1.664 | 1.566 | 1.343 | 1.415 | 1.494 | 1.793 | 1.478 | 1.611 | 1.610 |
| f2 | −1.687 | −1.664 | −1.277 | −1.319 | −1.552 | −1.882 | −1.520 | −1.668 | −1.651 |
| f3 | 2.491 | 2.251 | 1.709 | 2.521 | 2.061 | 2.570 | 2.137 | 2.309 | 2.351 |
| f12 | 6.301 | 4.938 | 4.728 | 4.981 | 4.729 | 5.089 | 4.062 | 4.289 | 5.217 |
| FNO | 2.44 | 2.44 | 2.44 | 2.44 | 2.44 | 2.44 | 2.44 | 2.44 | 2.44 |
| TTL | 2.868 | 2.589 | 2.404 | 2.857 | 2.448 | 2.879 | 2.469 | 2.614 | 2.688 |
| IH | 1.750 | 1.750 | 1.750 | 1.750 | 1.750 | 1.750 | 1.750 | 1.750 | 1.750 |
| FOV | 78.00° | 77.00° | 76.20° | 70.00° | 78.40° | 71.48° | 71.20° | 70.80° | 76.40° |

It can be appreciated by one having ordinary skill in the art that the description above is only embodiments of the present invention. In practice, one having ordinary skill in the art can make various modifications to these embodiments in forms and details without departing from the scope of the present invention.

What is claimed is:

1. A camera optical lens, comprising, from an object side to an image side:

a first lens having a positive refractive power;
a second lens having a negative refractive power; and
a third lens having a positive refractive power,
wherein the camera optical lens satisfies following conditions:
$0.65 \leq f1/f \leq 0.85$;
$-0.90 \leq f2/f \leq -0.60$;
$1.00 \leq f3/f \leq 1.20$;
$-8.00 \leq (R5+R6)/(R5-R6) \leq -2.50$;
$2.50 \leq d5/d4 \leq 4.50$; and
$1.55 \leq n2 \leq 1.70$,
where
f denotes a focal length of the camera optical lens;
f1 denotes a focal length of the first lens;
f2 denotes a focal length of the second lens;
f3 denotes a focal length of the third lens;
R5 denotes a central curvature radius of an object side surface of the third lens;
R6 denotes a central curvature radius of an image side surface of the third lens;
d4 denotes an on-axis distance from an image side surface of the second lens to the object side surface of the third lens;
d5 denotes an on-axis thickness of the third lens; and
n2 denotes a refractive index of the second lens.

2. The camera optical lens as described in claim 1, further satisfying a following condition:
$1.50 \leq d1/d2 \leq 3.50$,
where
d1 denotes an on-axis thickness of the first lens; and
d2 denotes an on-axis distance from an image side surface of the first lens to an object side surface of the second lens.

3. The camera optical lens as described in claim 1, further satisfying a following condition:
$-3.00 \leq (R3+R4)/(R3-R4) \leq -1.50$,
where
R3 denotes a central curvature radius of an object side surface of the second lens; and
R4 denotes a central curvature radius of the image side surface of the second lens.

4. The camera optical lens as described in claim 1, further satisfying following conditions:
$-1.72 \leq (R1+R2)/(R1-R2) \leq -0.21$; and
$0.08 \leq d1/TTL \leq 0.44$,
where
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

5. The camera optical lens as described in claim 1, further satisfying a following condition:
$0.03 \leq d3/TTL \leq 0.19$,
where
d3 denotes an on-axis thickness of the second lens; and
TTL denotes a total optical length from an object side surface of the first lens to an image plane of the camera optical lens along an optic axis.

6. The camera optical lens as described in claim 1, further satisfying a following condition:
$0.07 \leq d5/TTL \leq 0.46$,
where TTL denotes a total optical length from an object side surface of the first lens to an image plane of the camera optical lens along an optic axis.

7. The camera optical lens as described in claim 1, further satisfying a following condition:
$TTL/IH \leq 1.65$,
where
IH denotes an image height of the camera optical lens; and
TTL denotes a total optical length from an object side surface of the first lens to an image plane of the camera optical lens along an optic axis.

8. The camera optical lens as described in claim 1, wherein a field of view of the camera optical lens is greater than or equal to 70°.

9. The camera optical lens as described in claim 1, wherein an F number of the camera optical lens is smaller than or equal to 2.51.

10. The camera optical lens as described in claim 1, further satisfying a following condition:
$1.10 \leq f12/f \leq 4.37$,
where f12 denotes a combined focal length of the first lens and the second lens.

* * * * *